US011820871B2

(12) United States Patent
Inaba et al.

(10) Patent No.: US 11,820,871 B2
(45) Date of Patent: Nov. 21, 2023

(54) ALUMINUM OXIDE-FORMING COMPOSITION AND METHOD FOR PRODUCING SAME

(71) Applicant: Tosoh Finechem Corporation, Shunan (JP)

(72) Inventors: Koichiro Inaba, Shunan (JP); Kouji Toyota, Shunan (JP); Kenichi Haga, Shunan (JP); Toshio Naka, Shunan (JP); Toshiaki Taniike, Nomi (JP)

(73) Assignee: TOSOH FINECHEM CORPORATION, Yamaguchi (JP)

( * ) Notice: Subject to any disclaimer, the term of this patent is extended or adjusted under 35 U.S.C. 154(b) by 0 days.

(21) Appl. No.: 17/583,350

(22) Filed: Jan. 25, 2022

(65) Prior Publication Data

US 2022/0144657 A1 May 12, 2022

Related U.S. Application Data

(62) Division of application No. 16/302,444, filed as application No. PCT/JP2017/018000 on May 12, 2017, now Pat. No. 11,267,940.

(30) Foreign Application Priority Data

May 16, 2016 (JP) .................................. 2016-098174
Nov. 2, 2016 (JP) .................................. 2016-215555

(51) Int. Cl.
   *C01F 7/02* (2022.01)
   *C08J 3/20* (2006.01)
   (Continued)

(52) U.S. Cl.
   CPC ............... *C08J 3/201* (2013.01); *B05D 7/04* (2013.01); *C01F 7/02* (2013.01); *C01G 9/02* (2013.01);
   (Continued)

(58) Field of Classification Search
   CPC ..................................... C01F 7/02; C01F 7/30
   See application file for complete search history.

(56) References Cited

U.S. PATENT DOCUMENTS

| 4,716,206 A | 12/1987 | Fujita et al. |
| 2008/0032823 A1 | 2/2008 | Shindo et al. |
| 2018/0145179 A1 | 5/2018 | Toyota et al. |

FOREIGN PATENT DOCUMENTS

| JP | S5891030 A | 5/1983 |
| JP | S58151325 A | 9/1983 |
| | (Continued) | |

OTHER PUBLICATIONS

Translation JP-2016043298 (Year: 2016).*
(Continued)

*Primary Examiner* — Hoa (Holly) Le
(74) *Attorney, Agent, or Firm* — Panitch Schwarze Belisario & Nadel LLP

(57) ABSTRACT

A method for producing aluminum oxide is provided. The method uses an aluminum-oxide-forming agent containing a partially hydrolyzed aluminum alkyl compound containing an aluminum trialkyl or a mixture thereof, and a solvent. It is thus possible to produce an aluminum oxide thin film or aluminum oxide particles on or in a substrate that is not resistant to polar solvents. A method of producing a polyolefin-based polymer nanocomposite containing zinc oxide particles or aluminum oxide particles using a solution containing a partially hydrolyzed zinc alkyl or a solution containing a partially hydrolyzed aluminum alkyl is also provided. The polyolefin-based polymer nanocomposite contains a polyolefin substrate and zinc oxide particles or aluminum oxide particles, and does not contain a dispersant. The zinc oxide particles or aluminum oxide particles have an average particle size of less than 100 nm.

6 Claims, 17 Drawing Sheets

(51) Int. Cl.
*C01G 9/02* (2006.01)
*C07F 5/06* (2006.01)
*C08K 3/22* (2006.01)
*C08L 23/00* (2006.01)
*C23C 18/12* (2006.01)
*C23C 26/00* (2006.01)
*B05D 7/04* (2006.01)

(52) U.S. Cl.
CPC ............... *C07F 5/062* (2013.01); *C08K 3/22* (2013.01); *C08L 23/00* (2013.01); *C23C 18/12* (2013.01); *C23C 26/00* (2013.01); *C01P 2002/01* (2013.01); *C01P 2002/72* (2013.01); *C01P 2002/82* (2013.01); *C08J 2323/12* (2013.01); *C08K 2003/2227* (2013.01); *C08K 2003/2296* (2013.01); *C08K 2201/003* (2013.01); *C08K 2201/011* (2013.01)

(56) References Cited

FOREIGN PATENT DOCUMENTS

| JP | S6150903 | B2 | | 4/1986 | | |
|---|---|---|---|---|---|---|
| JP | H04139005 | A | | 5/1992 | | |
| JP | H04153287 | A | | 5/1992 | | |
| JP | H07309911 | A | | 11/1995 | | |
| JP | H09111054 | A | | 4/1997 | | |
| JP | 2003335905 | A | | 11/2003 | | |
| JP | 2008174607 | A | | 7/2008 | | |
| JP | 2009510180 | A | | 3/2009 | | |
| JP | 2009242779 | A | | 10/2009 | | |
| JP | 2011122005 | A | | 6/2011 | | |
| JP | 2012087019 | A | | 5/2012 | | |
| JP | 5332743 | B2 | | 11/2013 | | |
| JP | 2015117260 | A | | 6/2015 | | |
| JP | 2016043298 | A | * | 4/2016 | ............... | B05D 1/02 |
| JP | 2016043298 | A | | 4/2016 | | |
| JP | 2016124942 | A | | 7/2016 | | |
| WO | 2007005921 | A2 | | 1/2007 | | |
| WO | 2007043496 | A1 | | 4/2007 | | |
| WO | 2010026668 | A1 | | 3/2010 | | |
| WO | 2012053433 | A1 | | 4/2012 | | |
| WO | 2012053436 | A1 | | 4/2012 | | |
| WO | 2016027861 | A1 | | 2/2016 | | |
| WO | WO-2016027861 | A1 | * | 2/2016 | ............... | B05D 1/02 |

OTHER PUBLICATIONS

Translation WO-2016027861A1 (Year: 2016).*
Chinese Master's Theses Full text Database, Engineering Science and Technology I, pp. 57-58 (2007).
Int'l Preliminary Report on Patentability dated Nov. 20, 2018 in Int'l Application No. PCT/JP2017/018000.
Int'l Search Report and Written Opinion dated Aug. 1, 2017 in Int'l Application No. PCT/JP2017/018000.
Office Action dated Jul. 3, 2020 issued on Chinese Application No. 201780030640.9 (English Machine Translation).
Office Action dated Jan. 4, 2021 in U.S. Appl. No. 16/302,444.
Office Action dated Feb. 5, 2021 in KR Application No. 1020187035061 (with English Machine Translation).
Office Action dated Apr. 15, 2021 in U.S. Appl. No. 16/302,444.
Office Action dated Apr. 20, 2021 in JP Application No. 2018518266.
Office Actiondated May 24, 2021 in CN Application No. 201780030640.9 (with English Machine Translation).
Office Action dated Jun. 25, 2020 in U.S. Appl. No. 16/302,444.
Office Action dated Aug. 27, 2021 in KR Application No. 1020187035061 (with English Machine Translation).
Office Action dated Nov. 18, 2021 in CN Application No. 201780030640.9.
Office Action dated Jul. 9, 2020 issued in Taiwanese Application No. 106116086 (English Translation).
Uchida et al., Sumitomo Chemical Company, Limited, Technical Journal, Vo.1. 1, pp. 45 to 49, (2000) (English Abstract).
Wan-You et al., "Synthesis of Alkyl Aluminoxane Cocatalyst and It's Application in Ethylene Tetramerization Catalyst System", Department of Chemistry & Chemical Engineering, 5 pages, May 2009 (English Absrtact).
Yasaka, Jeti., 10, pp. 134 to 140, (2005).
Office Action dated Apr. 5, 2022 in JP Application No. 2021087353 (with English Machine Translation).
Office Action dated Dec. 22, 2022 in U.S. Appl. No. 17/583,379 of Inaba.
Moezzi et al., Zinc oxide particles: Synthesis, properties and applications, Chemical Engineering Journal, vols. 185-186, pp. 1-22 (2012).

* cited by examiner

ALUMINUM OXIDE-FORMING COMPOSITION AND METHOD FOR PRODUCING SAME

CROSS-REFERENCE TO RELATED APPLICATIONS

This application is a Divisional of co-pending U.S. patent application Ser. No. 16/302,444, filed Nov. 16, 2018, which is a Section 371 of International Application No. PCT/JP2017/018000, filed May 12, 2017, which was published in the Japanese language on Nov. 23, 2017, under International Publication No. WO 2017/199870 A1, which claims priority under 35 U.S.C. § 119(b) to Japanese Application No. 2016-098174 filed on May 16, 2016 and Japanese Application No. 2016-215555 filed on Nov. 2, 2016, the disclosures of which are incorporated herein by reference in their entireties.

TECHNICAL FIELD

The present invention relates to a composition for forming aluminum oxide, which comprises a solution containing an alkyl aluminum partial hydrolyzate, a method for producing same, and a method for producing aluminum oxide. By using the solution containing an alkyl aluminum partial hydrolyzate of the present invention, it is possible to form an aluminum oxide thin film on a substrate that is not resistant to polar solvents or to incorporate aluminum oxide particles in a substrate that is not resistant to polar solvents. The present invention also relates to a polyolefin-based polymer nanocomposite containing zinc oxide particles or aluminum oxide particles and a method for producing same.

BACKGROUND ART (First Aspect of Invention)

Aluminum oxide exhibits excellent characteristics in terms of high strength, high heat resistance, high thermal conductivity, low coefficient of thermal expansion, insulation properties, and the like, and is therefore widely used in a variety of applications.

Aluminum oxide thin films are used in applications such as producing aluminum oxide sheets for electronic materials and aluminum oxide films, producing catalyst carriers, imparting heat resistance, imparting barrier properties against air and moisture, imparting an anti-reflection effect, an anti-static effect, an anti-fogging effect, abrasion resistance and the like, and as binders for producing ceramics. Such aluminum oxide thin films require high purity (see NPL 1). Specifically, examples of applications of such aluminum oxide thin films include protective films for cutting tools, insulating films for semiconductors, magnetic bodies, solar cells and the like, packaging materials for surface devices, magnetic heads, infrared radiation sensors, foods, medicines, medical equipment and the like, optical members, and the like.

Aluminum oxide particles are used in applications such as ceramic raw materials, fillers for rubbers and plastics, and abrasive materials (see NPL 2). Specifically, examples of applications of aluminum oxide particles include fillers for resins for high heat conduction, fillers for adjusting the refractive index, reflectance, workability, flexibility and the like of resins, and sintering raw materials for fine ceramics.

Aluminum oxide thin films are formed using methods such as sputtering methods, chemical vapor deposition (CVD) methods and atomic layer deposition (ALD) methods.

However, because methods such as sputtering methods, CVD methods and ALD methods require the use of large sealed containers, problems occur such as production costs for aluminum oxide thin films increasing and material usage efficiency decreasing.

Coating methods such as spin coating methods, dip coating methods, screen printing methods, die coating methods and spray coating methods do not require use of sealed containers, unlike the methods mentioned above, and have advantages such as involving simple apparatuses, enabling rapid film production speeds and enabling aluminum oxide thin films to be produced with lower production costs.

A variety of investigations have been carried out into formation of aluminum oxide thin films using coating methods (see PTL 1 to 4).

In the method disclosed in PTL 1, however, in cases where a passivation film is produced by a heat treatment (firing), it is necessary to degrease (remove) residual organic components such as binder resins and ligands by firing. As a result, there was the problem that a long firing time was required or a heat treatment at a high temperature of approximately 400° C. to 1000° C. was required.

Furthermore, there is the problem that transparent aluminum oxide (having a transmittance of 80% or more of visible light having a wavelength of 550 nm) is difficult to obtain by means of heat treatment at a low temperature. In cases where transparent aluminum oxide was to be obtained, there was the problem that non-heat resistant substrates, such as plastics, could not be used because firing at temperatures of 300° C. or higher was necessary.

In the method disclosed in PTL 2, because additives and solvents are carboxylic acids and polar solvents such as ethers, there was the problem that it was not possible to use substrates such as acrylic resins and polycarbonate resins, which are not resistant to polar solvents.

PTL 3 and 4 disclose methods for forming alumina thin films and compositions for forming alumina thin films. These documents disclose methylaluminoxane or the like as an aluminum-containing compound contained in a composition for forming an alumina thin film. There are no production examples of aluminum oxide thin films using this, and descriptions of composition solutions are abstract.

Furthermore, PTL 3 and 4 disclose examples in which thin films are produced using a dibutyl aluminum hydride solution, a tri-n-octyl aluminum solution or a tri-n-dodecyl aluminum solution. However, problems occurred, such as aluminum usage efficiency greatly deteriorating, and especially reproducibility in terms of film quality being difficult to achieve when producing a film in air, due to dibutyl aluminum hydride, tri-n-octyl aluminum and tri-n-dodecyl aluminum vaporizing with a solvent when the solvent was removed by drying.

(Second Aspect of Invention)

A polymer-based nanocomposite is a composite material in which an inorganic oxide is dispersed in a polymer, generally in the form of ultrafine particles having sizes of 1 to 100 nm. Unlike conventional inorganic oxide filler-filled polymers, a polymer-based nanocomposite has the characteristics of the added quantity of an inorganic oxide being low and the surface area of the inorganic oxide being greatly increased.

Because the distance between inorganic oxide particles is extremely small in a polymer-based nanocomposite as a result of the characteristics mentioned above, interactions between the inorganic oxide and the polymer matrix are greatly increased and the characteristics of the polymer substrate are improved, and it can be expected that the polymer is imparted with functionality (see NPL 3).

It is known that a polymer-based nanocomposite that contains zinc oxide exhibits improved polymer substrate characteristics, such as improved thermal stability of the polymer matrix, improved abrasion resistance, increased refractive index, and improved stability to ultraviolet radiation.

In addition, it is known that a polymer-based nanocomposite that contains zinc oxide imparts functionality such as electrical conductivity, ultraviolet radiation absorption, antibacterial properties and refractive index adjustment (see PTL 5).

It is expected that polymer-based nanocomposites containing aluminum oxide particles will also impart functionality such as thermal conductivity, abrasion resistance and refractive index adjustment (see PTL 6).

Even in conventional inorganic oxide filler-filled polymers, investigations have been carried out by forming polymers that contain micron sized aluminum oxide, aluminum nitride, or the like, having average particle diameters of 55 µm as fillers to impart thermal conductivity (see PTL 7).

Meanwhile, among polymers, polyolefins are commonly used plastics which are inexpensive, have high melting points, exhibit molding processing properties and exhibit excellent recycling properties. In recent years, many investigations have been carried out into replacing inorganic materials and engineering plastics with polyolefin-based nanocomposites obtained by nanocompositing polyolefins and inorganic oxides.

However, dispersing inorganic oxides in polyolefins that exhibit poor polarity is not easy, and addition of dispersing agents, chemical modification of inorganic oxide surfaces, and the like, has been carried out in order to improve dispersibility. However, problems such as loss of improvement effects exhibited by other additives occurred as a result of interactions between dispersing agents and chemical modification agents and other additives such as flame retardants, antidegradants and coloring agents contained in industrial use polyolefins.

Furthermore, in the production method disclosed in PTL 5, a thiol compound or a dispersing agent such as a silane coupling agent must be added in order to prevent aggregation of the inorganic oxide. Problems occurred, such as unpleasant odors being generated as a result of use of a thiol compound, increased costs caused by use of a silane coupling agent, and loss of improvement effects exhibited by other additives as a result of interactions between the dispersing agent and other additives.

Many investigations have been carried out into inorganic oxide filler-filled polymers, such as that disclosed in PTL 7, rather than nanocomposites. In such cases, problems occurred, such as the need to add a dispersing agent, as mentioned above, interactions between the polymer and the inorganic oxide being weak in comparison with nanocomposites, the need to use a large quantity of inorganic oxide filler, and the characteristics of the polymer being greatly reduced.

Furthermore, polyolefins have been mentioned as the polymers in the polymer-based nanocomposite and inorganic oxide filler-filled polymer disclosed in PTL 5 and 7. However, there are no specific examples of methods for producing these, and it is surmised that the inorganic oxide will actually aggregate in cases where a polyolefin that exhibits poor polarity is used.

The production method disclosed in PTL 6 can produce a polyolefin-based nanocomposite containing aluminum oxide without using a dispersing agent, but significant improvements in inorganic oxide dispersion are needed.

[PTL 1] Japanese Examined Patent Publication No. S61-050903
[PTL 2] Japanese Patent No. 5332743
[PTL 3] WO 2012/053433
[PTL 4] WO 2012/053436
[PTL 5] Japanese Translation of PCT Application No. 2009-510180
[PTL 6] Japanese Patent Application Publication No. 2016-124942
[PTL 7] Japanese Patent Application Publication No. 2015-117260
[NPL 1] Yasaka, JETI., 10 (2005) pages 134 to 140
[NPL 2] Uchida et al, Sumitomo Chemical Company, Limited, technical journal, 1 (2000), pages 45 to 49
[NPL 3] Kiyoshi NAKAJO, "Technical Trends in Polymer-based Nanocomposites", CMC Publishing, page 3, 2001

All the statements in PTL 1 to 7 and NPL 1 to 3 are hereby incorporated by reference.

SUMMARY OF INVENTION

Technical Problem

In cases where the methods or materials disclosed in PTL 1 to 4 are used, it is not possible to form an aluminum oxide thin film on a substrate that is not resistant to polar solvents or form aluminum oxide particles in a substrate that is not resistant to polar solvents.

As a result, the purpose of the first aspect of the present invention is to provide an agent that can form an aluminum oxide thin film on a substrate such as an acrylic resin or polycarbonate resin that is not resistant to polar solvents such as ethers, alcohols, ketones, carboxylic acids and esters, or can form aluminum oxide particles in such a substrate.

The purpose of the second aspect of the present invention is to provide, without adding a dispersing agent, a polyolefin-based nanocomposite which contains zinc oxide particles or aluminum oxide particles in a well dispersed state in a polyolefin base material and which contains zinc oxide particles or aluminum oxide particles having an average particle diameter of less than 100 nm even if the oxide concentration is 3 wt % or more, and a method for producing same.

Solution to Problem

The first aspect of the present invention is as follows.

[1]

A method for producing a composition for forming a particulate or thin film-shaped aluminum oxide, which is comprised of a solution containing an alkyl aluminum partial hydrolyzate, the method comprising: adding water to a solution containing an alkyl aluminum compound and a non-polar organic solvent at a molar ratio of 0.5 to 1.4 relative to aluminum in the alkyl aluminum compound to produce the solution containing the alkyl aluminum partial hydrolyzate, wherein the alkyl aluminum compound is comprised of a trialkyl aluminum or a mixture thereof, wherein the alkyl groups may be the same or different and have 4 to 12 carbon atoms.

[2]

The production method according to [1], wherein the trialkyl aluminum is an alkyl aluminum compound represented by general formula (1) below.

[C1]

$$AlR^1_3 \qquad (1)$$

in the formula, $R^1$ represents an isobutyl group, an n-hexyl group or an n-octyl group, and the three $R^1$ groups may be the same or different)

[3]

The production method according to [2], wherein the trialkyl aluminum is triisobutyl aluminum.

[4]

The production method according to any one of [1] to [3], wherein the non-polar organic solvent is an aromatic hydrocarbon.

[5]

The production method according to [4], wherein the aromatic hydrocarbon is toluene and/or xylene.

[6]

The production method according to any one of [1] to [3], wherein the non-polar organic solvent is an aliphatic hydrocarbon.

[7]

The production method according to [6], wherein the aliphatic hydrocarbon is at least one aliphatic hydrocarbon selected from the group consisting of heptane, methylcyclohexane, ethylcyclohexane, n-decane, n-undecane, n-dodecane and tridecane.

[8]

A composition for forming a particulate or thin film-shaped aluminum oxide, which is comprised of a solution containing an alkyl aluminum partial hydrolyzate and a non-polar organic solvent, wherein the alkyl groups in the alkyl aluminum partial hydrolyzate may be the same or different and have 4 to 12 carbon atoms, the molar ratio of alkyl groups relative to aluminum atoms falls within the range of 0.2 to 2, and the molar ratio of oxygen atoms relative to aluminum atoms falls within the range of 1.4 to 0.5.

[9]

The composition according to [8], wherein the alkyl groups are at least one alkyl group selected from the group consisting of isobutyl groups, n-hexyl groups and n-octyl groups.

[10]

The composition according to [8] or [9], wherein the non-polar organic solvent is an aromatic hydrocarbon.

[11]

The composition according to [10], wherein the aromatic hydrocarbon is toluene and/or xylene.

[12]

The composition according to [8] or [9], wherein the non-polar organic solvent is an aliphatic hydrocarbon.

[13]

The composition according to [12], wherein the aliphatic hydrocarbon is at least one aliphatic hydrocarbon selected from the group consisting of heptane, methylcyclohexane, ethylcyclohexane, n-decane, n-undecane, n-dodecane and tridecane.

[14]

A method for producing an aluminum oxide thin film, the method comprising: coating a substrate with the composition according to any one of [8] to [13], and then removing the non-polar organic solvent to form an aluminum oxide thin film.

[15]

A method for producing a particulate aluminum oxide-containing substrate, the method comprising: mixing the composition according to any one of [8] to [13] with a substrate-forming binder, and then removing the non-polar organic solvent to form a particulate aluminum oxide in the binder.

The second aspect of the present invention is as follows.

[16]

A method for producing a polyolefin-based polymer nanocomposite containing zinc oxide particles, the method being characterized by using a solution containing a partial hydrolyzate of a dialkyl zinc, wherein the alkyl groups may be the same or different and have 1 to 14 carbon atoms, and a polyolefin powder.

[17]

The production method according to [16], which comprises (A) a step of impregnating a polyolefin powder with a solution containing a partial hydrolyzate of a dialkyl zinc (here, the alkyl groups may be the same or different and have 1 to 12 carbon atoms), (B) a step of removing an organic solvent contained in the polyolefin powder, and (D) a step of melting the polyolefin powder by heating to obtain a polyolefin-based polymer nanocomposite containing zinc oxide particles.

[18]

The production method according to [17], which comprises, between steps (B) and (D), (C) a step of supplying moisture to the alkyl zinc partial hydrolyzate contained in the polyolefin powder to facilitate hydrolysis of the partial hydrolyzate.

[19]

The production method according to any one of [16] to [18], wherein the solution containing a partial hydrolyzate is prepared by adding water at a molar ratio of 0.5 to 1.4 relative to zinc in a dialkyl zinc to a solution containing the dialkyl zinc and an organic solvent.

[20]

The production method according to any one of [16] to [19], wherein the molar ratio of water relative to zinc in the dialkyl zinc falls within the range of 0.5 to 0.9.

[21]

The production method according to any one of [16] to [20], wherein the dialkyl zinc is represented by general formula (2-1) below.

[C2]

$$ZnR^{10}_2 \qquad (2\text{-}1)$$

In the formula, $R^{10}$ represents a methyl group, an ethyl group, an n-butyl group, an isobutyl group, a sec-butyl group or a tert-butyl group, and the two $R^{10}$ groups may be the same or different.

[22]

The production method according to any one of [16] to [21], wherein the dialkyl zinc is diethyl zinc.

[23]

The production method according to any one of [16] to [22], wherein the polyolefin powder is a polyethylene powder or a polypropylene powder.

[24]
The production method according to any one of [16] to [23], wherein the polyolefin powder has been prepared using a Ziegler-Natta catalyst.

[25]
A polyolefin-based polymer nanocomposite, which comprises a polyolefin base material and zinc oxide particles and does not contain a dispersing agent, wherein the average particle diameter of the zinc oxide particles is less than 100 nm.

[26]
The nanocomposite according to [25], wherein the content of the zinc oxide particles is 3 wt % or more.

[27]
The nanocomposite according to [25] or [26], wherein the zinc oxide particles are dispersed in the polyolefin base material.

[28]
A method for producing a polyolefin-based polymer nanocomposite which contains aluminum oxide particles, the method being characterized by using a solution containing a partial hydrolyzate of an alkyl aluminum compound comprised of a trialkyl aluminum or a mixture thereof, and a polyolefin powder.

[29]
The production method according to [28], which comprises (E) a step of impregnating a polyolefin powder with a solution containing a partial hydrolyzate of an alkyl aluminum compound comprised of a trialkyl aluminum or a mixture thereof wherein the alkyl groups may be the same or different and have 1 to 12 carbon atoms, (F) a step of drying the polyolefin powder by removing an organic solvent contained therein, and (H) a step of melting the polyolefin powder by heating to obtain a polyolefin-based polymer nanocomposite containing aluminum oxide particles.

[30]
The production method according to [29], which comprises, between steps (F) and (H), (G) a step of supplying moisture to the alkyl aluminum partial hydrolyzate contained in the polyolefin powder to facilitate hydrolysis of the partial hydrolyzate.

[31]
The production method according to any one of [28] to [30], wherein the solution containing a partial hydrolyzate is prepared by adding water to a solution containing an organic solvent and an alkyl aluminum compound comprised of a trialkyl aluminum or a mixture thereof at a molar ratio of 0.5 to 1.4 relative to aluminum in the alkyl aluminum compound.

[32]
The production method according to any one of [28] to [31], wherein the trialkyl aluminum is an alkyl aluminum compound represented by general formula (2-2) below.

[C3]

$$AlR^2_3 \quad (2-2)$$

In the formula, $R^2$ represents a methyl group, an ethyl group, an isobutyl group, an n-hexyl group or an n-octyl group, and the three $R^2$ groups may be the same or different.

[33]
The production method according to any one of [28] to [32], wherein the trialkyl aluminum is triethyl aluminum.

[34]
The production method according to any one of [28] to [33], wherein the trialkyl aluminum is triisobutyl aluminum.

[35]
The production method according to any one of [28] to [34], wherein the polyolefin powder is a polyethylene powder or a polypropylene powder.

[36]
The production method according to any one of [28] to [35], wherein the polyolefin powder has been prepared using a Ziegler-Natta catalyst.

[37]
A polyolefin-based polymer nanocomposite, which contains a polyolefin base material and aluminum oxide particles and does not contain a dispersing agent, wherein the average particle diameter of the aluminum oxide particles is less than 100 nm.

[38]
The nanocomposite according to [37], wherein the content of the aluminum oxide particles is 3 wt % or more.

[39]
The nanocomposite according to [37] or [38], wherein the aluminum oxide particles are dispersed in the polyolefin base material.

[40]
The nanocomposite according to any one of [37] to [39], which further contains aluminum hydroxide particles.

Advantageous Effects of Invention

According to the first aspect of the present invention, by using an alkyl aluminum partial hydrolyzate composition solution that does not contain a polar solvent, it is possible to form an aluminum oxide thin film on a substrate that is not resistant to polar solvents or form aluminum oxide particles in a substrate that is not resistant to polar solvents.

According to the second aspect of the present invention, it is possible to provide a polyolefin-based nanocomposite which does not contain a dispersing agent and which contains zinc oxide particles or aluminum oxide particles having an average particle diameter of less than 100 nm in a polyolefin base material. Furthermore, the nanocomposite of the present invention contains zinc oxide particles or aluminum oxide particles in a well dispersed state in the nanocomposite even if the content of the zinc oxide particles or aluminum oxide particles is 3 wt % or more.

DESCRIPTION OF EMBODIMENTS

Figure 1:
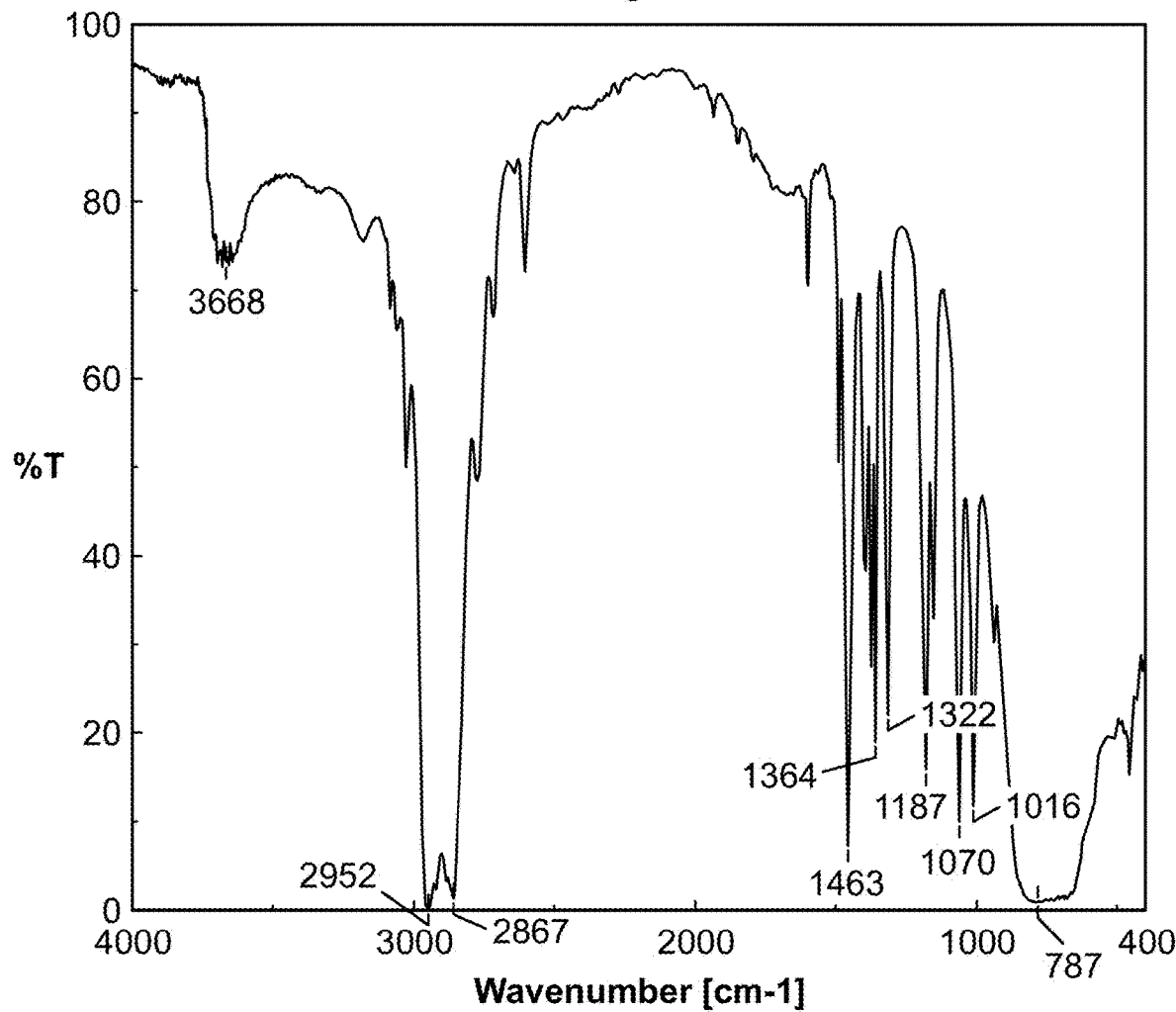
FIG. 1 is a transmission IR spectrum of a product obtained by drying a toluene solution of a triisobutyl aluminum hydrolyzate composition.

[Method for Producing Solution Containing Alkyl Aluminum Partial Hydrolyzate (First Aspect)]

The present invention relates to a method for producing a composition for forming a particulate or thin film-shaped aluminum oxide, which is comprised of a solution containing an alkyl aluminum partial hydrolyzate, the method including a step of adding water at a molar ratio of 0.5 to 1.4 relative to aluminum in an alkyl aluminum compound to a solution containing a partial hydrolyzate of the alkyl aluminum compound, which is comprised of a trialkyl aluminum or a mixture thereof wherein the alkyl groups may be the same or different and have 4 to 12 carbon atoms, and a non-polar organic solvent to obtain the solution containing an alkyl aluminum partial hydrolyzate.

The trialkyl aluminum is preferably an alkyl aluminum compound represented by general formula (1) below.

[C4]

$$AlR^1{}_3 \qquad (1)$$

In the formula, $R^1$ represents an isobutyl group, an n-hexyl group or an n-octyl group, and the three $R^1$ groups may be the same or different.

Examples of the compound represented by general formula (1) include triisobutyl aluminum, tri-n-hexyl aluminum, tri-n-octyl aluminum, tridodecyl aluminum and tritetradecyl aluminum. From the perspective of being inexpensive in terms of cost per unit mass of aluminum and the perspectives of the aluminum concentration in a solution prepared from the compound and the aluminum oxide conversion concentration, triisobutyl aluminum, tri-n-hexyl aluminum and tri-n-octyl aluminum are preferred, and triisobutyl aluminum is particularly preferred.

As examples of the compound represented by general formula (1), trimethyl aluminum and triethyl aluminum are not preferred from the perspectives of difficulty in controlling reactivity with water without polar solvents and costs being incurred due to the need for specialist equipment for adding water, and trimethyl aluminum in particular is not preferred due to being expensive in terms of cost per unit mass of aluminum.

Examples of these non-polar solvents include aromatic hydrocarbons and aliphatic hydrocarbons.

Examples of aromatic hydrocarbons include benzene, toluene, o-xylene, m-xylene, p-xylene, mixed xylene (xylene), ethylbenzene, isopropylbenzene, mesitylene, pseudocumene, amylbenzene, o-cymene, m-cymene, p-cymene, mixed cymene (cymene), o-diethylbenzene, m-diethylbenzene, p-diethylbenzene, mixed diethylbenzene (diethylbenzene), cyclohexylbenzene and tetralin.

From the perspective of being inexpensive and the perspective that a suitably high boiling point is preferred in order to increase film formation properties, toluene and xylene are particularly preferred.

Examples of aliphatic hydrocarbons include pentane, methylcyclopentane, hexane, cyclohexane, methylcyclohexane, ethylcyclohexane, heptane, nonane, octane, n-decane, n-undecane, n-dodecane, tridecane, tetradecane, kerosene, decalin, petroleum ether, petroleum benzine, solvent naphtha, dipentene, turpentine oil, o-menthane, m-menthane, p-menthane, mixed menthane (menthane) and ligroin.

From the perspective of being inexpensive and the perspective that a suitably high boiling point is preferred in order to increase film formation properties, heptane, methylcyclohexane, ethylcyclohexane, n-decane, n-undecane, n-dodecane and tridecane are particularly preferred.

The non-polar solvents cited here are the aromatic hydrocarbons and aliphatic hydrocarbons mentioned above, and polar solvents are ether-based solvents such as diethyl ether, dipropyl ether, diisopropyl ether, dibutyl ether, tetrahydrofuran, dioxane, anisole and methyl-t-butyl ether; alcohol-based solvents such as ethanol, isopropyl alcohol, butanol, ethylene glycol, diethylene glycol, ethylene glycol monomethyl ether, ethylene glycol monobutyl ether, ethylene glycol monoacetate, ethylene glycol dibutyl ether, propylene glycol, dipropylene glycol, dipropylene glycol monomethyl ether and hexylene glycol; ketone- and aldehyde-based solvents such as acetone, acetophenone, cyclohexanone, diacetone alcohol, methyl isobutyl ketone and methyl ethyl ketone; carboxylic acids such as acetic acid and formic acid; ester-based solvents such as ethyl acetate, n-butyl acetate, s-butyl acetate and γ-butyl lactone; nitrogen-containing compound-based solvents such as acetonitrile, propionitrile, butyronitrile and triethylamine; and ethylene carbonate and propylene carbonate.

Here, polarity is evaluated in terms of dielectric constant, dipole moment, solubility parameter, or the like, and solvents are experimentally classified into non-polar solvents and polar solvents, as shown above.

The alkyl aluminum compound is partially hydrolyzed using water at a molar ratio within the range of 0.5 to 1.4 relative to the alkyl aluminum compound. If the molar ratio of water relative to the alkyl aluminum compound is less than 0.5, a liquid form tends to remain even after the solvent is removed by drying and it is difficult to form a uniform aluminum oxide thin film or particles. From the perspective of forming a uniform aluminum oxide thin film or particles, the molar ratio of water relative to the alkyl aluminum compound is preferably 0.5 or more, and more preferably 0.8 or more. Meanwhile, if the molar ratio of water relative to the alkyl aluminum compound exceeds 1.4, insoluble gel or solid precipitates in the solvent and it is difficult to form a uniform aluminum oxide thin film or particles due to the presence of the gel or solid, and this molar ratio is therefore preferably 1.4 or less, and more preferably 1.3 or less. Precipitated gel or solid can be removed by means of decanting, filtration or the like.

The partial hydrolysis reaction of the alkyl aluminum compound is carried out by adding water to the non-polar solvent in an inert gas atmosphere.

The concentration of the alkyl aluminum compound in the alkyl aluminum compound solution to which the water is added can be 2 to 98 mass %.

The period of addition of the water to the alkyl aluminum compound solution can be specified as appropriate according to the types, volumes, and the like, of the raw materials being mixed, but can fall within the range of 1 minute to 10 hours. The temperature during the addition can be selected as appropriate within the range of −15° C. to 150° C. However, this temperature preferably falls within the range of −15° C. to 80° C. in view of safety and the like.

Following addition of water or a water-containing solution, an aging reaction can be carried out for a period of 0.1 to 50 hours in order for the partial hydrolysis reaction between the alkyl aluminum compound and water to progress further. The temperature during the aging reaction can be selected as appropriate within the range of −15° C. to 150° C. However, this temperature preferably falls within the range of 25° C. to 150° C. from perspectives such as shortening the aging reaction time.

The alkyl aluminum compound, water and non-polar solvent can be introduced into a reaction vessel using any commonly used method. The pressure inside the reaction vessel is not limited. The hydrolysis reaction step is not particularly limited, and can be a batch type process, a semi-batch type process or a continuous process, but a batch type process is preferred.

A solution containing the alkyl aluminum partial hydrolyzate is obtained by means of this partial hydrolysis reaction. Partial hydrolyzate compositions have long been analyzed in cases where an alkyl aluminum compound is triisobutyl aluminum, but compositional analysis results of products vary from report to report, and product compositions have not been clearly specified. In addition, the product composition varies according to differences in the solvent, the concentration, the added molar ratio of water, the addition temperature, the reaction temperature, the reaction period, and the like.

[Aluminum Oxide-Forming Composition]

The present invention relates to an aluminum oxide-forming composition, and this composition is a composition for forming particulate or thin film-shaped aluminum oxide, which comprises a solution containing an alkyl aluminum partial hydrolyzate and a non-polar organic solvent, wherein the alkyl groups in the alkyl aluminum partial hydrolyzate may be the same or different and have 4 to 12 carbon atoms, the molar ratio of alkyl groups relative to aluminum atoms falls within the range of 0.2 to 2, and the molar ratio of oxygen atoms relative to aluminum atoms falls within the range of 1.4 to 0.5. The alkyl groups preferably have 4 to 8 carbon atoms, and are more preferably isobutyl groups, n-hexyl groups or n-octyl groups.

The inventors of the present invention found that an alkyl aluminum partial hydrolyzate in which each of the alkyl groups has 4 to 12 carbon atoms, the molar ratio of alkyl groups relative to aluminum atoms falls within the range of 0.2 to 2, and the molar ratio of oxygen atoms relative to aluminum atoms falls within the range of 1.4 to 0.5 can be dissolved even in non-polar organic solvents.

From the perspective of being able to be dissolved well in non-polar organic solvents, and especially the aromatic hydrocarbons and aliphatic hydrocarbons mentioned above, the molar ratio of alkyl groups relative to aluminum atoms preferably falls within the range of 0.2 to 2, more preferably falls within the range 0.8 to 1.8, and further preferably falls within the range of 1.0 to 1.5. The molar ratio of oxygen atoms relative to aluminum atoms preferably falls within the range of 1.4 to 0.5, more preferably falls within the range of 1.4 to 0.7, and further preferably falls within the range of 1.3 to 0.9.

It is presumed that the alkyl aluminum partial hydrolyzate in the method of the present invention is a mixture of compounds including structural units represented by general formula (2) below.

[C5]

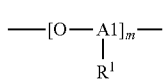

(2)

In the formula, $R^1$ is defined in the same way as $R^1$ in general formula (1), and m is an integer between 1 and 80.

In cases where solids and the like are precipitated following completion of the partial hydrolysis reaction, the solids and the like can be removed through purification by means of a method such as filtration.

The solid content concentration in the solution containing the alkyl aluminum partial hydrolyzate can be adjusted by means of concentrating (solvent removal). In addition, the solid content concentration, polarity, viscosity, boiling point, profitability, and the like, can be adjusted as appropriate by adding the solvent used in the reaction or a non-polar solvent that is different from that used in the reaction.

Examples of polar solvents that are different from the solvent used in the reaction include the same solvents as the non-polar solvents mentioned above.

The content of the alkyl aluminum partial hydrolyzate in the solution containing the alkyl aluminum partial hydrolyzate of the present invention can be decided as appropriate according to the intended use of the invention. This content can be adjusted by adjusting the quantity of non-polar solvent. The content of the alkyl aluminum partial hydrolyzate can be adjusted as appropriate within a range of, for example, 1 to 90 mass %. However, it is not intended that this content be limited to this range. From perspectives such as solubility and viscosity, the content of the alkyl aluminum partial hydrolyzate preferably falls within the range of 5 to 50 mass %.

The content of the alkyl aluminum partial hydrolyzate is preferably 5 mass % or more from the perspectives of drying being difficult because the material content is low and the solvent content is high and the amount of discharged solvent to be treated being high, and the content of the alkyl aluminum partial hydrolyzate is preferably 50 mass % or less from the perspectives of the viscosity increasing and white solids and the like precipitating during production. However, it is not intended that this content be limited to this range, and the content of the alkyl aluminum partial hydrolyzate can be decided as appropriate according to the intended use of the invention, and the like.

If it is assumed that all of the aluminum contained in the solution containing the alkyl aluminum partial hydrolyzate of the present invention is converted into aluminum oxide ($Al_2O_3$), the aluminum oxide conversion concentration is defined as the percentage of the mass of aluminum oxide relative to the mass of the solution containing the alkyl aluminum partial hydrolyzate.

The aluminum oxide conversion concentration of the solution containing the alkyl aluminum partial hydrolyzate of the present invention can be adjusted as appropriate within a range of, for example, 5 to 50 mass %. However, it is not intended that this conversion concentration be limited to this range.

[Method for Producing Aluminum Oxide Thin Film]

The method for producing an aluminum oxide thin film of the present invention is a method in which an aluminum oxide thin film is obtained by coating a substrate with the solution containing the alkyl aluminum partial hydrolyzate of the present invention.

The substrate can be coated using a commonly used coating method, such as a spin coating method, a dip coating method, a screen printing method, a bar coating method, a slit coating method, a die coating method, a gravure coating method, a roll coating method, a curtain coating method, a spray thermal decomposition method, an electrostatic spray thermal decomposition method, an inkjet method or a mist CVD method.

The substrate can be coated in an inert gas atmosphere or an air atmosphere.

The substrate can be coated under increased pressure or reduced pressure, but from the perspective of profitability, an apparatus in which coating is carried out under atmospheric pressure is preferred due to the apparatus being simple.

The substrate can be a glass such as a lead glass, a soda glass, a borosilicate glass or an alkali-free glass; an oxide such as silica, alumina, titania, zirconia or a composite oxide; or a polymer such as polyethylene (PE), polypropylene (PP), poly(ethylene terephthalate) (PET), poly(ethylene naphthalate) (PEN), poly(methyl methacrylate) (PMMA), a polycarbonate (PC), poly(phenylene sulfide) (PPS), polystyrene (PS), poly(vinyl alcohol) (PVA), poly(vinyl chloride) (PVC), poly(vinylidene chloride), a cyclic polyolefin (COP), an ethylene-vinyl acetate copolymer (EVA), a polyimide, a polyamide, a polyethersulfone (PES), a polyurethane, triacetate, triacetyl cellulose (TAC), cellophane, polytetrafluoroethylene (PTFE), polychlorotrifluoroethylene (PCTFE), poly(vinylidene fluoride) (PVDF), poly(vinyl fluoride) (PVF), a perfluoroalkoxyfluororesin (PFA), a tetrafluoroethylene-hexafluoropropylene copolymer (ETFE) or an ethylene-chlorotrifluoroethylene copolymer (ECTFE).

The form of the substrate may be a powder, a film, a sheet or a solid structure having a three-dimensional form.

The aluminum oxide thin film is formed by coating the solution containing the alkyl aluminum partial hydrolyzate, adjusting the substrate to a prescribed temperature, and then firing at a prescribed temperature either after removing the solvent by drying or while removing the solvent by drying. Moreover, in cases where the coating is carried out using a spray thermal decomposition method, an electrostatic spray thermal decomposition method, an inkjet method or a mist CVD method, it is possible to carry out solvent removal at the time of coating or carry out firing at the time of solvent removal because the substrate can be heated to the prescribed temperature prior to coating.

The prescribed temperature for removing the solvent by drying can be selected as appropriate within a range of, for example, 20° C. to 250° C. The solvent can be removed by drying over a period of, for example, 0.5 to 60 minutes. However, it is not intended that these conditions be limited to these ranges.

The prescribed temperature for firing in order to form the aluminum oxide can be selected as appropriate within a range of, for example, 50° C. to 550° C. However, depending on the type of substrate, the temperature should be set so that the substrate is not damaged. In cases where the prescribed temperature for firing is the same as the prescribed temperature for removing the solvent by drying, the solvent removal and the firing can be carried out simultaneously. The dried precursor film from which the solvent has been removed by drying can be fired over a period of, for example, 0.5 to 300 minutes.

The thickness of aluminum oxide thin film obtained in the manner described above can be, for example, 0.005 to 3 μm. However, it is not intended that this thickness be limited to this range. The thickness of the aluminum oxide thin film can be increased if necessary by repeatedly carrying out the steps of coating, drying and firing mentioned above.

The crystallinity and compactness of the aluminum oxide can, if necessary, be improved by heating the aluminum oxide thin film obtained in the manner described above to a prescribed temperature in an oxidizing gas atmosphere such as oxygen, a reducing gas atmosphere such as hydrogen, a water vapor atmosphere in which a large quantity of water is present or a plasma atmosphere such as argon, nitrogen or oxygen. Organic residues and the like present in the obtained aluminum oxide thin film can be removed by irradiating with ultraviolet radiation or the like or treating with microwaves.

[Method for Producing Substrate Containing Particulate Aluminum Oxide]

The method for producing a substrate containing particulate aluminum oxide of the present invention is a method in which a substrate containing particulate aluminum oxide is obtained by mixing the solution containing the alkyl aluminum partial hydrolyzate of the present invention with the substrate raw material when the substrate is produced.

When producing the substrate, the substrate raw material and the solution containing the alkyl aluminum partial hydrolyzate can be introduced into a production apparatus using any commonly used method. The pressure inside the production apparatus is not limited.

The substrate can be the same as the substrate used when producing the aluminum oxide thin film. The substrate raw material is a material able to serve as a raw material of these substrates, and is preferably a polymer material.

The aluminum oxide produced using the method for producing an aluminum oxide thin film of the present invention and the particulate aluminum oxide formed in the substrate in the method for producing a particulate aluminum oxide-containing substrate differ in terms of firing, post-treatment conditions, and the like, but are assumed to be gibbsite, bayersite, boehmite or diaspore, which are hydrates, or γ-, η-, δ-, θ-, κ- or α-alumina. In cases where treatment is carried out in a water vapor atmosphere or the like, the aluminum oxide may be converted into aluminum hydroxide.

Aluminum oxide produced at a temperature of 500° C. or lower in the present invention generally has no clear peaks in X-Ray diffraction analysis, and is in an amorphous state.

[Method for Producing Polyolefin-Based Polymer Nanocomposite Containing Zinc Oxide Particles (First Mode of Second Aspect)]

A first mode of the second aspect of the present invention relates to a method for producing a polyolefin-based polymer nanocomposite containing zinc oxide particles, the method being characterized by using a polyolefin powder and a solution containing a partial hydrolyzate of a dialkyl zinc wherein the alkyl groups may be the same or different and have 1 to 14 carbon atoms.

More specifically, the first mode of the second aspect of the present invention comprises (A) a step of impregnating a polyolefin powder with a solution containing a partial hydrolyzate of a dialkyl zinc wherein the alkyl groups may be the same or different and have 1 to 12 carbon atoms, (B) a step of removing an organic solvent contained in the polyolefin powder, and (D) a step of melting the polyolefin powder by heating.

Step (A)

The dialkyl zinc is preferably represented by general formula (2-1) below.

[C6]

$$ZnR^{10}_2 \qquad (2\text{-}1)$$

In the formula, $R^{10}$ represents a methyl group, an ethyl group, an n-butyl group, an isobutyl group, a sec-butyl group or a tert-butyl group. The two $R^{10}$ groups may be the same or different.

Examples of compounds represented by general formula (2-1) include dimethyl zinc, diethyl zinc, di-n-butyl zinc, diisobutyl zinc, di-sec-butyl zinc and di-tert-butyl zinc. From the perspective of being inexpensive in terms of cost per unit mass of zinc, diethyl zinc is preferred.

The solution containing a partial hydrolyzate is preferably prepared by adding water at a molar ratio of 0.5 to 1.4 relative to zinc in a dialkyl zinc to a solution containing the dialkyl zinc and an organic solvent.

Examples of the organic solvent include aromatic hydrocarbons, aliphatic hydrocarbons, ether-based solvents not containing active hydrogen, and other organic solvents.

Examples of aromatic hydrocarbons include benzene, toluene, o-xylene, m-xylene, p-xylene, mixed xylene (xylene), ethylbenzene, isopropylbenzene, mesitylene, pseudocumene, amylbenzene, o-cymene, m-cymene, p-cymene, mixed cymene (cymene), o-diethylbenzene, m-diethylbenzene, p-diethylbenzene, mixed diethylbenzene (diethylbenzene), cyclohexylbenzene and tetralin.

Examples of aliphatic hydrocarbons include pentane, methylcyclopentane, hexane, cyclohexane, methylcyclohexane, ethylcyclohexane, heptane, nonane, octane, n-decane, n-undecane, n-dodecane, tridecane, tetradecane, kerosene, decalin, petroleum ether, petroleum benzine, solvent naphtha, dipentene, turpentine oil, o-menthane, m-menthane, p-menthane, mixed menthane (menthane) and ligroin.

Examples of ether-based solvents not containing active hydrogen include diethyl ether, dipropyl ether, diisopropyl ether, dibutyl ether, tetrahydrofuran, dioxane, anisole, methyl tert-butyl ether, dimethoxyethane and 1,2-diethoxyethane.

Examples of other solvents include ester-based solvents, such as ethyl acetate, n-butyl acetate, s-butyl acetate and γ-butyl lactone, and N-methylpyrrolidone.

The dialkyl zinc can be partially hydrolyzed using water. The molar ratio of water relative to the dialkyl zinc is not particularly limited, but preferably falls within the range of 0.5 to 1.4, and more preferably 0.5 to 0.9. If the molar ratio of water relative to the dialkyl zinc is less than 0.5, residual dialkyl zinc causes the polyolefin to readily aggregate during impregnation and drying and means that it is difficult to form zinc oxide having an average particle diameter of 100 nm or less in the polyolefin. Meanwhile, if the molar ratio of water relative to the dialkyl zinc is excessively high, insoluble gels and solids are precipitated in the solvent. From the perspective of forming uniform zinc oxide particles in the polyolefin, it is preferable for precipitated gels and solids to be removed by means of decanting, filtration, or the like.

The partial hydrolysis reaction of the dialkyl zinc is carried out by adding water to the organic solvent in an inert gas atmosphere.

The concentration of the dialkyl zinc in the dialkyl zinc solution to which water is added can be, for example, 5 to 98 mass %.

The water can be diluted using the organic solvent and added as a water-containing solution.

The water can be added dropwise using a syringe or added using a dropping funnel or the like. In addition, it is possible to add the water as mist-like droplets by bringing the water into contact with pressurized nitrogen or the like using a 2-fluid spray nozzle mechanism or the like.

The period of addition of the water or water-containing solution to the dialkyl zinc solution can be specified as appropriate according to the types, volumes, and the like, of the raw materials being mixed, but can fall within the range of 1 minute to 10 hours. The temperature during the addition can be selected as appropriate within the range of −20° C. to 150° C. However, this temperature preferably falls within the range of −15° C. to 80° C. in view of safety and the like.

Following addition of water or a water-containing solution, an aging reaction can be carried out fora period of 0.1 to 50 hours in order for the partial hydrolysis reaction between the dialkyl zinc and water to progress further. The temperature during the aging reaction can be selected as appropriate within the range of −15° C. to 150° C. However, this temperature preferably falls within the range of 25° C. to 150° C. from perspectives such as shortening the aging reaction time.

The dialkyl zinc, water and organic solvent can be introduced into a reaction vessel using any commonly used method. The pressure inside the reaction vessel is not limited. The hydrolysis reaction step is not particularly limited, and can be a batch type process, a semi-batch type process or a continuous process, but a batch type process is preferred.

A solution containing the alkyl zinc partial hydrolyzate is obtained by means of this partial hydrolysis reaction. Partial hydrolyzate compositions have long been analyzed in cases where a dialkyl zinc is diethyl zinc. However, compositional analysis results of products vary from report to report, and product compositions have not been clearly specified. In addition, the product composition varies according to differences in the solvent, the concentration, the added molar ratio of water, the addition temperature, the reaction temperature, the reaction period, and the like.

It is presumed that the alkyl zinc partial hydrolyzate in the method of the present invention is a mixture of compounds including structural units represented by general formula (2-3) below.

[C7]

$$R^{10}-[Zn-O]_m-R^{10} \quad (2\text{-}3)$$

In the formula, $R^{10}$ is defined in the same way as $R^{10}$ in general formula (2-1), and m is an integer between 1 and 20.

In cases where solids and the like are precipitated following completion of the partial hydrolysis reaction, the solids and the like can be removed through purification by means of a method such as filtration.

The solid content concentration in the solution containing the alkyl zinc partial hydrolyzate can be adjusted by means of concentrating (solvent removal). In addition, the solid content concentration, polarity, viscosity, boiling point, profitability, and the like, can be adjusted as appropriate by adding the solvent used in the reaction or an organic solvent that is different from that used in the reaction.

The content of the alkyl zinc partial hydrolyzate in the solution containing the alkyl zinc partial hydrolyzate of the present invention can be decided as appropriate. This content can be adjusted by adjusting the quantity of organic solvent. The content of the alkyl zinc partial hydrolyzate can be adjusted as appropriate within a range of, for example, 5 to 90 mass %. However, it is not intended that this content be limited to this range. From perspectives such as solubility and viscosity, the content of the alkyl zinc partial hydrolyzate preferably falls within the range of 5 to 50 mass %.

The content of the alkyl zinc partial hydrolyzate is preferably 5 mass % or more from the perspectives of drying being difficult because the material content is low and the solvent content is high and the amount of discharged solvent to be treated being high. The content of the alkyl aluminum partial hydrolyzate is preferably 50 mass % or less from the perspectives of the viscosity increasing and white solids and the like precipitating during production.

If it is assumed that all of the zinc contained in the solution containing the alkyl zinc partial hydrolyzate is converted into zinc oxide (ZnO), the zinc oxide conversion concentration in the solution containing the alkyl zinc partial hydrolyzate is defined as the percentage of the mass of zinc oxide relative to the mass of the solution containing the alkyl zinc partial hydrolyzate.

The zinc oxide conversion concentration of the solution containing the alkyl zinc partial hydrolyzate can be adjusted as appropriate within a range of, for example, 5 to 40 mass %.

Examples of polyolefins that constitute the polyolefin powder include ethylene homopolymers; ethylene copolymers obtained by polymerizing ethylene and at least one type selected from propylene and α-olefins having 4 to 8 carbon atoms; propylene homopolymers; and propylene copolymers obtained by polymerizing propylene and at least one type selected from ethylene and α-olefins having 4 to 8 carbon atoms. These polyolefins may contain, as second and third comonomers, small quantities of dienes, vinyl acetate, unsaturated carboxylic acids, unsaturated carboxylic acid esters, and aromatic monomers such as styrene and styrene derivatives. In the present invention, polyethylene is defined as the ethylene homopolymer and ethylene copolymers mentioned above, and polypropylene is defined as the polypropylene homopolymer and propylene copolymers mentioned above.

Examples of methods for producing the polyolefin powder of the present invention include the Ziegler-Natta process, a metallocene process and high pressure radical polymerization methods. However, it is not intended that the production method be limited to the methods mentioned above. The polyolefin powder is preferably porous from the perspective of reliably enabling impregnation by the solution containing the alkyl zinc partial hydrolyzate. From the perspective of being able to obtain a porous polyolefin powder, the method for producing the polyolefin powder is preferably the Ziegler-Natta process. The polyolefin powder used in the present invention is preferably a powder obtained using the Ziegler-Natta process.

The polyolefin is preferably in the form of a powder from the perspective of facilitating impregnation by the solution containing the alkyl zinc partial hydrolyzate. Furthermore, the diameter of particles constituting the powder is preferably relatively small from the perspective of the solution containing the alkyl zinc partial hydrolyzate impregnating into the inner part of the particles and being able to obtain a nanocomposite in which zinc oxide particles are in a well dispersed state. The average particle diameter of particles constituting the powder should fall within a range of, for example, 0.1 to 1000 μm. However, it is not intended that this average particle diameter be limited to this range.

The polyolefin particles are preferably porous from the perspective of facilitating impregnation by the solution containing the alkyl zinc partial hydrolyzate. As an indicator of porosity, the density (bulk density) should fall within a range of, for example, 0.8 to 1.0 g/cm³. However, it is not intended that this density be limited to this range.

Impregnation of the solution containing the alkyl zinc partial hydrolyzate into the polyolefin powder is preferably carried out in a reducing atmosphere or inert atmosphere, and more preferably carried out in a nitrogen atmosphere from the perspective of profitability.

The polyolefin powder can be impregnated under increased pressure or reduced pressure, but from the perspective of profitability, an apparatus in which impregnation is carried out under atmospheric pressure is preferred due to the apparatus being simple.

Aging can be carried out for a period of 0.1 to 50 hours in order for the polyolefin powder to be uniformly impregnated. The aging temperature can be selected as appropriate within the range of −15° C. to 100° C. However, this temperature preferably falls within the range of 25° C. to 100° C. from perspectives such as shortening the aging time.

In this step, it is possible to add an antioxidant to the solution containing the partial hydrolyzate that is impregnated in the polyolefin powder in order to prevent thermal degradation of the polyolefin in the melting and heating step (D) described later. Alternatively, it is possible to simultaneously impregnate the polyolefin powder with a solution containing a partial hydrolyzate and a solution containing an antioxidant. Alternatively, it is possible to impregnate the polyolefin powder with a solution containing a partial hydrolyzate and then impregnate the polyolefin powder with a solution containing an antioxidant. The solution containing an antioxidant can be one obtained by dissolving an antioxidant in an organic solvent listed for the solution containing a partial hydrolyzate. It is possible to use a publicly known antioxidant for polyolefins, as appropriate, as the antioxidant. The quantity of antioxidant added to the polyolefin powder can fall within a range of, for example, 0.01 to 1 mass % according to the type of antioxidant and type of polyolefin. However, it is not intended that this added quantity be limited to this range.

Examples of antioxidants include phenol-based antioxidants such as 1,3,5-tris(3,5-di-t-butyl-4-hydroxybenzyl)-1, 3,5-triazine-2,4,6(1H,3H,5H)-trione, 4,4',4"-(1-methylpropanyl-3-ylidene)tris(6-t-butyl-m-cresol), 6,6'-di-t-butyl-4, 4'-butylidenedi-m-cresol, octadecyl 3-(3,5-di-t-butyl-4-hydroxyphenyl)propionate, pentaerythritol tetrakis [3-(3,5-di-t-butyl-4-hydroxyphenyl)propionate], 3,9-bis{2-[3-(3-t-butyl-4-hydroxy-5-methylphenyl)propionyloxy]-1,1-dimethylethyl}-2,4,8,10-tetraoxaspiro[5.5]undecane and 1,3,5-t-tris(3,5-di-t-butyl-4-hydroxyphenyl)-2,4,6-trimethylbenzene.

(B) Organic solvent removal step

In step (B), organic solvent contained in the solution containing the partial hydrolyzate is removed from the polyolefin powder. The organic solvent removal is not particularly limited as long as organic solvent can be removed from the polyolefin powder obtained in step (A). For example, organic solvent removal can be carried out by drying the polyolefin powder obtained in step (A) at a prescribed temperature. It is possible to select an appropriate temperature within a range of, for example, 20° C. to 100° C., and the drying can be carried out at atmospheric pressure or under reduced pressure. It is preferable for the temperature to be 100° C. or lower and for the pressure to be reduced from the perspective of preventing the polyolefin from melting prior to removing the solvent. The solvent can be removed by drying over a period of, for example, 0.5 minutes to 50 hours. However, it is not intended that these conditions be limited to these ranges.

(D) Melting and heating step

After carrying out the organic solvent removal step, impregnation is carried out at a temperature that is not lower than the melting point of the polyolefin using a type of mixer or extruder, and the polyolefin powder from which the solvent has been removed by drying is then melt kneaded. The melt kneading temperature can be decided as appropriate according to the type of polyolefin in view of the melting point thereof. For example, the melt kneading temperature is preferably 120° C. to 150° C. in the case of polyethylene and 160° C. to 200° C. in the case of polypropylene from the perspective of minimizing thermal degradation. The melt kneading can be carried out over a period of, for example, 1 minute to 50 hours. However, it is not intended that these conditions be limited to these ranges.

Through melting the polyolefin powder by heating, it is possible to obtain a polyolefin-based polymer nanocomposite containing zinc oxide particles. The content (concentration) of zinc oxide particles in a polyolefin-based polymer nanocomposite produced using the production method of the present invention is not particularly limited. However, it is preferable for the content of zinc oxide particles to be 3 wt % or more. If this content is less than 3 wt %, the advantageous effect of the zinc oxide is unlikely to be exhibited. However, if the upper limit of this content exceeds, for example, 40 wt %, the characteristics of the polyolefin are likely to be lost and costs tend to increase as a result of an increase in the quantity of zinc oxide. From perspectives such as these, it is preferable for the concentration of the zinc oxide particles to be adjusted as appropriate within the range of 3 to 40 wt %.

In the present invention, the zinc oxide content (concentration) in the nanocomposite is defined as the percentage of the mass of zinc oxide relative to the total mass of the polyolefin nanocomposite containing zinc oxide.

It is possible to produce a polyolefin nanocomposite containing zinc oxide by melt kneading, and then further heating, molding or granulating according to need. The form of the polyolefin nanocomposite can be a sheet, a film, chips, and the like, but is not particularly limited.

It is assumed that by carrying out steps (A), (B) and (D), the alkyl zinc partial hydrolyzate is converted into zinc oxide in the polyolefin as a result of a reaction represented by general formula (2-4) below.

[C8]

$$R^{10}-[Zn-O]_m-R^{10} \rightarrow m\ ZnO \quad (2\text{-}4)$$

In the formula, $R^{10}$ is defined in the same way as $R^{10}$ in general formula (2-1), and m is an integer between 1 and 20.

(C) Moisture supply step

Between the organic solvent removal step (B) and the melting and heating step (D), it is possible to incorporate a step (C) of supplying moisture to the alkyl zinc partial hydrolyzate contained in the polyolefin powder to facilitate hydrolysis.

Examples of methods for supplying moisture include spraying the polyolefin powder, which has been impregnated and dried by removing the solvent, into air for a sufficient period of time, bringing the polyolefin powder into contact with water vapor in a container such as a chamber, exposing the polyolefin powder to moist air in a container such as a chamber, and bringing water directly into contact with the polyolefin powder.

A reaction with moisture is preferably carried out at 20° C. to 100° C. when moisture is supplied. The moisture supply can be carried out over a period of, for example, 0.5 minutes to 50 hours. However, it is not intended that these conditions be limited to these ranges.

[Polyolefin-Based Polymer Nanocomposite Containing Zinc Oxide Particles]

The present invention encompasses a polyolefin-based polymer nanocomposite, which contains a polyolefin base material and zinc oxide particles and does not contain a dispersing agent, in which the average particle diameter of the zinc oxide particles is less than 100 nm. This polyolefin-based polymer nanocomposite can be produced using the production method of the present invention. The average particle diameter of zinc oxide particles in the polyolefin preferably falls within the range of not less than 1 nm and less than 100 nm. The polyolefin-based polymer nanocomposite of the present invention is a nanocomposite in which zinc oxide particles are dispersed well in a base material without using a dispersing agent (without using a dispersing agent as an auxiliary dispersing agent for the zinc oxide particles) despite using a polyolefin-based polymer, in which oxide particles are difficult to disperse, as the base material, and despite the average particle diameter of the zinc oxide particles being extremely low, namely less than 100 nm.

Moreover, in the present invention, the dispersing agent that is not contained in the nanocomposite refers to a chemical agent that is used in order to disperse the zinc oxide particles in the polyolefin base material. Additives described later, which are subsequently added to the nanocomposite and which have the effect of dispersing inorganic particles, do not correspond to the meaning of the dispersing agent mentioned here. Ultimately, this means that a dispersing agent used to disperse zinc oxide particles in the polyolefin base material is not used in the process for producing the nanocomposite, meaning that the nanocomposite of the present invention does not contain a dispersing agent.

The content (concentration) of zinc oxide particles in the polyolefin is not particularly limited, but can be, for example, 3 wt % or more. The zinc oxide content (concentration) in the nanocomposite is defined as the percentage of the mass of zinc oxide relative to the total mass of the polyolefin nanocomposite containing zinc oxide of the present invention.

The advantageous effect of the zinc oxide is unlikely to be exhibited if this content is less than 3 wt %, and if this content is 40 wt % or more, the characteristics of the polyolefin are likely to be lost and costs tend to increase as a result of an increase in the quantity of zinc oxide. From perspectives such as these, it is preferable for the concentration of the zinc oxide to be adjusted as appropriate within the range of 3 to 40 wt %.

The crystallinity and crystal form of the zinc oxide can, if necessary, be improved by heating the zinc oxide in the polyolefin obtained in the manner described above to a prescribed temperature in an oxidizing gas atmosphere such as oxygen, a reducing gas atmosphere such as hydrogen, or a plasma atmosphere such as argon, nitrogen or oxygen. The crystallinity and crystal form of the zinc oxide can also be improved by irradiating with ultraviolet radiation or the like or treating with microwaves.

The polyolefin nanocomposite containing zinc oxide particles of the present invention can improve basic characteristics of a polymer as a matrix, for example, can improve thermal stability and abrasion resistance, can adjust refractive index, and can improve stability against ultraviolet radiation, to impart functionality such as electrical conductivity, ultraviolet radiation absorption, antibacterial properties and refractive index adjustment. Therefore, it is expected that this polyolefin nanocomposite containing zinc oxide particles will be used as a replacement product for materials of existing products that require thermal stability, abrasion resistance, increased refractive index, stability against ultraviolet radiation, electrical conductivity, ultraviolet radiation absorption, antibacterial properties or refractive index adjustment.

The polyolefin nanocomposite containing zinc oxide particles of the present invention may contain a variety of additives as long as the advantageous effect of the zinc oxide particles contained in the composite is not impaired. Examples of such additives include plasticizers such as poly(alkylene oxide) oligomer-based compounds and organic phosphorus-based compounds, crystal nucleating agents such as talc, kaolin and organic phosphorus-based compounds, montanic acid waxes, metal soaps such as lithium stearate and aluminum stearate, lubricants, ultraviolet radiation blocking agents, coloring agents, flame retardants and foaming agents. These additives may be subsequently added to the polyolefin nanocomposite containing zinc oxide particles, but may also be added, for example, after the zinc oxide particles are dispersed in the polyolefin base material in the melting and heating step (D) that is the nanocomposite preparation step.

[Method for Producing Polyolefin-Based Polymer Nanocomposite Containing Aluminum Oxide Particles (Second Mode of Second Aspect)]

The second mode of second aspect of the present invention is a method for producing a polyolefin-based polymer nanocomposite which contains aluminum oxide particles, the method being characterized by using a polyolefin powder and a solution containing a partial hydrolyzate of an alkyl aluminum compound comprising a trialkyl aluminum or a mixture thereof (here, the alkyl groups may be the same or different and have 1 to 12 carbon atoms).

More specifically, the second mode of the second aspect of the present invention comprises (E) a step of impregnating a polyolefin powder with a solution containing a partial hydrolyzate of an alkyl aluminum compound comprising a trialkyl aluminum or a mixture thereof (here, the alkyl groups may be the same or different and have 1 to 12 carbon atoms), (F) a step of removing an organic solvent contained in the polyolefin powder, and (H) a step of melting the polyolefin powder by heating.

(E) Impregnation step

The trialkyl aluminum is preferably a trialkyl aluminum represented by general formula (2-2) below.

[C9]

$$AlR^2_3 \quad (2\text{-}2)$$

In the formula, $R^2$ represents a methyl group, an ethyl group, an isobutyl group, a n-hexyl group or an n-octyl group. The three $R^2$ groups may be the same or different.

Examples of the compound represented by general formula (2-2) include trimethyl aluminum, triethyl aluminum, triisobutyl aluminum, tri-n-hexyl aluminum, tri-n-octyl aluminum, tridodecyl aluminum and tritetradecyl aluminum. From the perspective of being inexpensive in terms of cost per unit mass of aluminum, trimethyl aluminum, triethyl aluminum and triisobutyl aluminum are preferred, and triethyl aluminum and triisobutyl aluminum are particularly preferred.

The solution containing a trialkyl aluminum partial hydrolyzate is preferably prepared by adding water at a molar ratio of 0.5 to 1.4 relative to aluminum in a trialkyl aluminum to a solution containing the trialkyl aluminum and an organic solvent. If the molar ratio of water relative to the trialkyl aluminum is less than 0.5, residual trialkyl aluminum causes the polyolefin to readily aggregate during impregnation and drying and means that it is difficult to form aluminum oxide having an average particle diameter of 100 nm or less in the polyolefin. Meanwhile, if the molar ratio of water relative to the trialkyl aluminum exceeds 1.4, insoluble gel or solid precipitates in the solvent and it is difficult to form uniform aluminum oxide particles in the polyolefin due to the presence of the gel or solid, and this molar ratio is therefore preferably 1.4 or less, and more preferably 1.3 or less. Precipitated gel or solid can be removed by means of decanting, filtration or the like.

Examples of the organic solvent include compounds similar to those used when producing the polyolefin nanocomposite containing zinc oxide.

The partial hydrolysis reaction of the trialkyl aluminum is carried out by adding water to the organic solvent in an inert gas atmosphere.

The concentration of the trialkyl aluminum in the trialkyl aluminum solution to which the water is added can be 5 to 98 mass %.

The water can be diluted using the organic solvent and added as a water-containing solution.

The water can be added dropwise using a syringe, a dropping funnel, or the like. In addition, it is possible to add the water as mist-like droplets by bringing the water into contact with pressurized nitrogen or the like using a 2-fluid spray nozzle mechanism or the like.

The period of addition of the water or water-containing solution to the trialkyl aluminum solution can be specified as appropriate according to the types, volumes, and the like, of the raw materials being mixed, but can fall within the range of 1 minute to 10 hours. The temperature during the addition can be selected as appropriate within the range of −20° C. to 150° C. However, this temperature preferably falls within the range of −15° C. to 80° C. in view of safety and the like.

Following addition of water or a water-containing solution, an aging reaction can be carried out for a period of 0.1 to 50 hours in order for the partial hydrolysis reaction between the trialkyl aluminum and water to progress further. The temperature during the aging reaction can be selected as appropriate within the range of −15° C. to 150° C.

The trialkyl aluminum, water and organic solvent can be introduced into a reaction vessel using any commonly used method. The pressure inside the reaction vessel is not limited. The hydrolysis reaction step is not particularly limited, and can be a batch type process, a semi-batch type process or a continuous process, but a batch type process is preferred.

A solution containing the alkyl aluminum partial hydrolyzate is obtained by means of this partial hydrolysis reaction. Alkyl aluminum partial hydrolyzate compositions have long been analyzed, but compositional analysis results of products vary from report to report, and product compositions have not been clearly specified. In addition, the product composition varies according to differences in the solvent, the concentration, the added molar ratio of water, the addition temperature, the reaction temperature, the reaction period, and the like.

It is presumed that the alkyl aluminum partial hydrolyzate in the method of the present invention is a mixture of compounds including structural units represented by general formula (2-5) below.

[C10]

(2-5)

(In the formula, $R^2$ is defined in the same way as $R^2$ in general formula (2-2), and m is an integer between 1 and 80.)

In cases where solids and the like are precipitated following completion of the partial hydrolysis reaction, the solids and the like can be removed through purification by means of a method such as filtration.

The solid content concentration in the solution containing the alkyl aluminum partial hydrolyzate can be adjusted by means of concentrating (solvent removal). In addition, the solid content concentration, polarity, viscosity, boiling point, profitability, and the like, can be adjusted as appropriate by adding the solvent used in the reaction or an organic solvent that is different from that used in the reaction.

The content of the alkyl aluminum partial hydrolyzate in the solution containing the alkyl aluminum partial hydrolyzate can be decided as appropriate. This content can be adjusted by adjusting the quantity of organic solvent. The content of the alkyl aluminum partial hydrolyzate can be adjusted as appropriate within a range of, for example, 5 to 90 mass %. However, it is not intended that this content be limited to this range. From perspectives such as solubility and viscosity, the content of the alkyl aluminum partial hydrolyzate preferably falls within the range of 5 to 70 mass %.

The content of the alkyl aluminum hydrolyzate is preferably 5 mass % or more from the perspectives of drying being difficult because the material content is low and the solvent content is high and the amount of discharged solvent to be treated being high, and the content of the alkyl aluminum partial hydrolyzate is preferably 70 mass % or less from the perspectives of viscosity increasing and white solids and the like precipitating during production.

If it is assumed that all of the aluminum contained in the solution containing the alkyl aluminum hydrolyzate is converted into aluminum oxide ($Al_2O_3$), the aluminum oxide conversion concentration in the solution containing the alkyl aluminum partial hydrolyzate is defined as the percentage of the mass of aluminum oxide relative to the mass of the solution containing the alkyl aluminum partial hydrolyzate.

The aluminum oxide conversion concentration of the solution containing the alkyl aluminum partial hydrolyzate can be adjusted as appropriate within a range of, for example, 5 to 40 mass %.

Examples of the polyolefin powder include polyolefin powders similar to that used when producing the polyolefin nanocomposite containing zinc oxide particles.

Impregnation of the solution containing the alkyl aluminum partial hydrolyzate into the polyolefin powder is preferably carried out in a reducing atmosphere or inert atmosphere, and more preferably carried out in a nitrogen atmosphere from the perspective of profitability.

The polyolefin powder can be impregnated under increased pressure or reduced pressure, but from the perspective of profitability, an apparatus in which impregnation is carried out under atmospheric pressure is preferred due to the apparatus being simple.

Aging can be carried out for a period of 0.1 to 50 hours in order for the polyolefin powder to be uniformly impregnated. The aging temperature can be selected as appropriate within the range of −15° C. to 100° C. However, this temperature preferably falls within the range of 25° C. to 100° C. from perspectives such as shortening the aging time.

In this step, it is preferable to add an antioxidant in order to prevent thermal degradation of the polyolefin in the melting and heating step (H) described later. It is possible to use a publicly known antioxidant for polyolefins as the antioxidant.

Examples of the antioxidant include antioxidants similar to that used when producing the polyolefin nanocomposite containing zinc oxide.

The aluminum oxide concentration in the nanocomposite is defined as the percentage of the mass of aluminum oxide relative to the total mass of the polyolefin nanocomposite containing aluminum oxide of the present invention.

The advantageous effect of the aluminum oxide is unlikely to be exhibited if this content is less than 3 wt %, and if this content is 40 wt % or more, the characteristics of the polyolefin are likely to be lost and costs tend to increase as a result of an increase in the quantity of aluminum oxide. From perspectives such as these, it is preferable for the concentration of the aluminum oxide to be adjusted as appropriate within the range of 3 to 40 wt %.

(F) Organic solvent removal step

In step (F), organic solvent contained in the solution containing the partial hydrolyzate is removed from the polyolefin powder. The organic solvent removal is not particularly limited as long as organic solvent can be removed from the polyolefin powder obtained in step (E). For example, organic solvent removal can be carried out by drying the polyolefin powder obtained in step (E) at a prescribed temperature. For the prescribed temperature for removing the organic solvent, it is possible to select a temperature as appropriate within a range of, for example, 20° C. to 100° C., and the drying can be carried out at atmospheric pressure or under reduced pressure. It is preferable for the temperature to be 100° C. or lower and the pressure to be reduced from the perspective of preventing the polyolefin from melting prior to removing the solvent. The solvent can be removed by drying over a period of, for example, 0.5 minutes to 50 hours. However, it is not intended that these conditions be limited to these ranges.

(H) Melting and heating step

After carrying out the organic solvent removal step, impregnation is carried out at a temperature that is not lower than the melting point of the polyolefin using a type of mixer or extruder, and the polyolefin powder from which the solvent has been removed by drying is then melt kneaded. The melt kneading temperature is preferably 120° C. to 150° C. in the case of polyethylene and 160° C. to 200° C. in the case of polypropylene from the perspective of minimizing thermal degradation. The melt kneading can be carried out over a period of, for example, 1 minute to 50 hours. However, it is not intended that these conditions be limited to these ranges.

Through melting the polyolefin powder by heating, it is possible to obtain a polyolefin-based polymer nanocomposite containing aluminum oxide particles. The content of aluminum oxide particles in a polyolefin-based polymer nanocomposite produced using the production method of the present invention is not particularly limited. However, it is preferable for the content of aluminum oxide particles to be 3 wt % or more. If this content is less than 3 wt %, the advantageous effect of the aluminum oxide is unlikely to be exhibited. However, if the upper limit of this content exceeds, for example, 40 wt %, the characteristics of the polyolefin are likely to be lost and costs tend to increase as a result of an increase in the quantity of aluminum oxide. From perspectives such as these, it is preferable for the content (concentration) of the aluminum oxide particles to be adjusted as appropriate within the range of 3 to 40 wt %.

In the present invention, the aluminum oxide content (concentration) in the nanocomposite is defined as the percentage of the mass of aluminum oxide relative to the total mass of the polyolefin nanocomposite containing aluminum oxide.

A polyolefin nanocomposite containing aluminum oxide is produced by melt kneading and then further heating, molding or granulating. The form of the polyolefin nanocomposite can be a sheet, a film, chips, and the like.

It is assumed that by carrying out steps (E), (F) and (H), the alkyl aluminum partial hydrolyzate is converted into aluminum oxide in the polyolefin as a result of a reaction represented by general formula (2-6) below.

[C11]

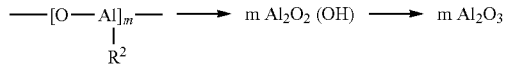

(2-6)

In the formula, $R^2$ is defined in the same way as $R^2$ in general formula (2-2), and m is an integer between 1 and 80.

(G) Moisture supply step

Between the organic solvent removal step (F) and the melting and heating step (H), it is possible to incorporate a step (G) of supplying moisture to the alkyl aluminum partial hydrolyzate contained in the polyolefin powder to facilitate hydrolysis.

Examples of the method for supplying moisture include supply methods similar to that used when producing the polyolefin nanocomposite containing zinc oxide.

A reaction with moisture is preferably carried out at 20° C. to 100° C. when moisture is supplied. The moisture supply can be carried out over a period of, for example, 0.5 minutes to 50 hours. However, it is not intended that these conditions be limited to these ranges.

[Polyolefin-Based Polymer Nanocomposite Containing Aluminum Oxide Particles]

The present invention is a polyolefin-based polymer nanocomposite, which contains a polyolefin base material and aluminum oxide particles and does not contain a dispersing agent, in which the average particle diameter of the aluminum oxide particles is less than 100 nm.

This polyolefin-based polymer nanocomposite can be produced using the production method of the present invention. The average particle diameter of aluminum oxide particles in the polyolefin preferably falls within the range of not less than 1 nm and less than 100 nm. The polyolefin-based polymer nanocomposite of the present invention is a nanocomposite in which aluminum oxide particles are dispersed well in a base material without using a dispersing agent (without using a dispersing agent as an auxiliary dispersing agent for the aluminum oxide particles) despite using a polyolefin-based polymer, in which oxide particles are difficult to disperse, as the base material, and despite the average particle diameter of the aluminum oxide particles being extremely fine, namely less than 100 nm.

Moreover, in the present invention, the dispersing agent that is not contained in the nanocomposite means a chemical agent that is used in order to disperse the aluminum oxide particles in the polyolefin base material. Additives described later, which are subsequently added to the nanocomposite and which have the effect of dispersing inorganic particles, do not correspond to the meaning of the dispersing agent mentioned here. Ultimately, this means that a dispersing agent used to disperse aluminum oxide particles in the polyolefin base material is not used in the process for producing the nanocomposite, meaning that the nanocomposite of the present invention does not contain a dispersing agent.

The content of aluminum oxide particles contained in the polyolefin obtained in the manner described above is not particularly limited, but can be, for example, 3 wt % or more. The aluminum oxide content (concentration) in the nanocomposite is defined as the percentage of the mass of aluminum oxide relative to the total mass of the polyolefin nanocomposite containing aluminum oxide of the present invention.

It is preferable to adjust the aluminum oxide concentration within the range of 3 to 40 wt % as appropriate because the advantageous effect of the aluminum oxide is unlikely to be exhibited if this content is less than 3 wt %, and if this content is 40 wt % or more, the characteristics of the polyolefin are likely to be lost and costs tend to increase as a result of an increase in the quantity of aluminum oxide.

The crystallinity and crystal form of the aluminum oxide can, if necessary, be improved by heating the aluminum oxide in the polyolefin obtained in the manner described above to a prescribed temperature in an oxidizing gas atmosphere such as oxygen, a reducing gas atmosphere such as hydrogen, or a plasma atmosphere such as argon, nitrogen or oxygen. The crystallinity and crystal form of the aluminum oxide can be improved by irradiating with ultraviolet radiation or the like or treating with microwaves.

It is known that aluminum oxide is generally in the form of gibbsite, bayersite, boehmite or diaspore, which are hydrates, or $\chi$-, $\gamma$-, $\eta$-, $\delta$-, $\theta$-, $\kappa$- or $\alpha$-alumina.

The aluminum oxide in the polyolefin produced in the present invention is a compound which contains aluminum element and oxygen element and in which these two elements account for 90% or more of the aluminum oxide.

The form of the aluminum oxide in the present invention differs according to post-treatment conditions and the like, but is assumed to be any of the well-known aluminum oxide forms mentioned above, depending on treatment temperatures and conditions. In addition, in cases where the moisture supply step (G) or the like is carried out, a part of the aluminum oxide may be converted into aluminum hydroxide.

Aluminum oxide produced at a temperature of 500° C. or lower in the present invention generally has no clear peaks in powder X-Ray diffraction analysis, and is in an amorphous state.

The polyolefin nanocomposite containing aluminum oxide particles of the present invention can impart functionality such as thermal conductivity, abrasion resistance and refractive index adjustment even in a polyolefin nanocomposite containing aluminum oxide particles. Therefore, it is expected that this polyolefin nanocomposite containing aluminum oxide particles will be used as a replacement product for materials of existing products that require thermal and electrical conductivity, abrasion resistance or refractive index adjustment.

The polyolefin nanocomposite containing aluminum oxide particles of the present invention may contain a variety of additives as long as the advantageous effect of the aluminum oxide particles contained in the nanocomposite is not impaired. Examples of such additives include plasticizers such as poly(alkylene oxide) oligomer-based compounds and organic phosphorus-based compounds, crystal nucleating agents such as talc, kaolin and organic phosphorus-based compounds, montanic acid waxes, metal soaps such as lithium stearate and aluminum stearate, lubricants, ultraviolet radiation blocking agents, coloring agents, flame retardants and foaming agents.

EXAMPLES

The present invention will now be explained in further detail on the basis of examples. However, the examples are merely examples of the present invention, and the present invention is not intended to be limited to the examples.

(First Aspect of Present Invention)

Preparation of the solution containing an alkyl aluminum compound and of the solution containing an alkyl aluminum partial hydrolyzate in the present invention were carried out in a nitrogen gas atmosphere, with all solvents being dehydrated and degassed.

<Number of Moles of Trialkyl Aluminum>

The number of moles of trialkyl aluminum was calculated using the following formula.

[Number of moles of trialkyl aluminum]=[mass (g) of trialkyl aluminum introduced]/[molecular weight of trialkyl aluminum (198.33 in the case of triisobutyl aluminum)]

<Measurement of Physical Properties>

The solution containing an alkyl aluminum partial hydrolyzate of the present invention was dried by removing solvent using an evaporator, and then subjected to transmission IR measurements using a FT-IR spectrophotometer ("FT/IR-4100" available from JASCO Corporation).

Aluminum oxide thin films produced using the production method of the present invention were subjected to relative IR measurements without ATR correction by means of an ATR (Attenuated Total Reflection) method using a ZnSe prism in a FT-IR spectrophotometer ("FT/IR-4100" available from JASCO Corporation).

Synthesis Example 1-1

12.90 g of triisobutyl aluminum (available from Tosoh Finechem Corporation) was added to 10.00 g of toluene at 20° C. and thoroughly stirred. Next, 1.289 g of water ([water]/[triisobutyl aluminum]=1.1 (molar ratio)) was added dropwise at 20° C. over a period of 30 minutes using a syringe. An aging reaction was carried out by continuing to stir for 3 hours at 25° C., and a small quantity of a precipitated solid was removed by being decanted, thereby obtaining a toluene solution containing a triisobutyl aluminum hydrolyzate composition.

The solvent was removed from the obtained toluene solution containing a triisobutyl aluminum hydrolyzate composition by drying for a period of 30 minutes at 40° C. using an evaporator, and a spectrum such as that shown in FIG. 1 was obtained when the obtained composition was subjected to transmission IR measurements. A broad Al—O—Al vibration peak was observed in the region of 400 to 1500 $cm^{-1}$, and it was confirmed that Al—O—Al bonds were formed as a result of hydrolysis.

Synthesis Example 1-2

21.61 g of triisobutyl aluminum was added to 10.00 g of toluene at 20° C. and thoroughly stirred. Next, 2.159 g of water ([water]/[triisobutyl aluminum]=1.1 (molar ratio)) was added dropwise at 20° C. over a period of 30 minutes using a syringe. Furthermore, an aging reaction was carried out by continuing to stir for 3 hours at 25° C., and a small quantity of a precipitated solid was removed by being decanted, thereby obtaining a toluene solution containing a triisobutyl aluminum hydrolyzate composition.

Synthesis Example 1-3

15.00 g of tri-n-hexyl aluminum (available from Tosoh Finechem Corporation) was added to 1.990 g of toluene at 20° C. and thoroughly stirred. Next, 1.052 g of water ([water]/[tri-n-hexyl aluminum]=1.2 (molar ratio)) was added dropwise at 20° C. over a period of 30 minutes using a syringe. Furthermore, an aging reaction was carried out by continuing to stir for 3 hours at 25° C., and a small quantity of a precipitated solid was removed by being decanted, thereby obtaining a toluene solution containing a tri-n-hexyl aluminum hydrolyzate composition.

Synthesis Example 1-4

15.01 g of tri-n-octyl aluminum (available from Tosoh Finechem Corporation) was added to 4.890 g of toluene at 20° C. and thoroughly stirred. Next, 0.958 g of water ([water]/[tri-n-octyl aluminum]=1.3 (molar ratio)) was added dropwise at 20° C. over a period of 30 minutes using a syringe. Furthermore, an aging reaction was carried out by continuing to stir for 3 hours at 25° C., and a small quantity of a precipitated solid was removed by being decanted, thereby obtaining a toluene solution containing a tri-n-octyl aluminum hydrolyzate composition.

Figure 2:
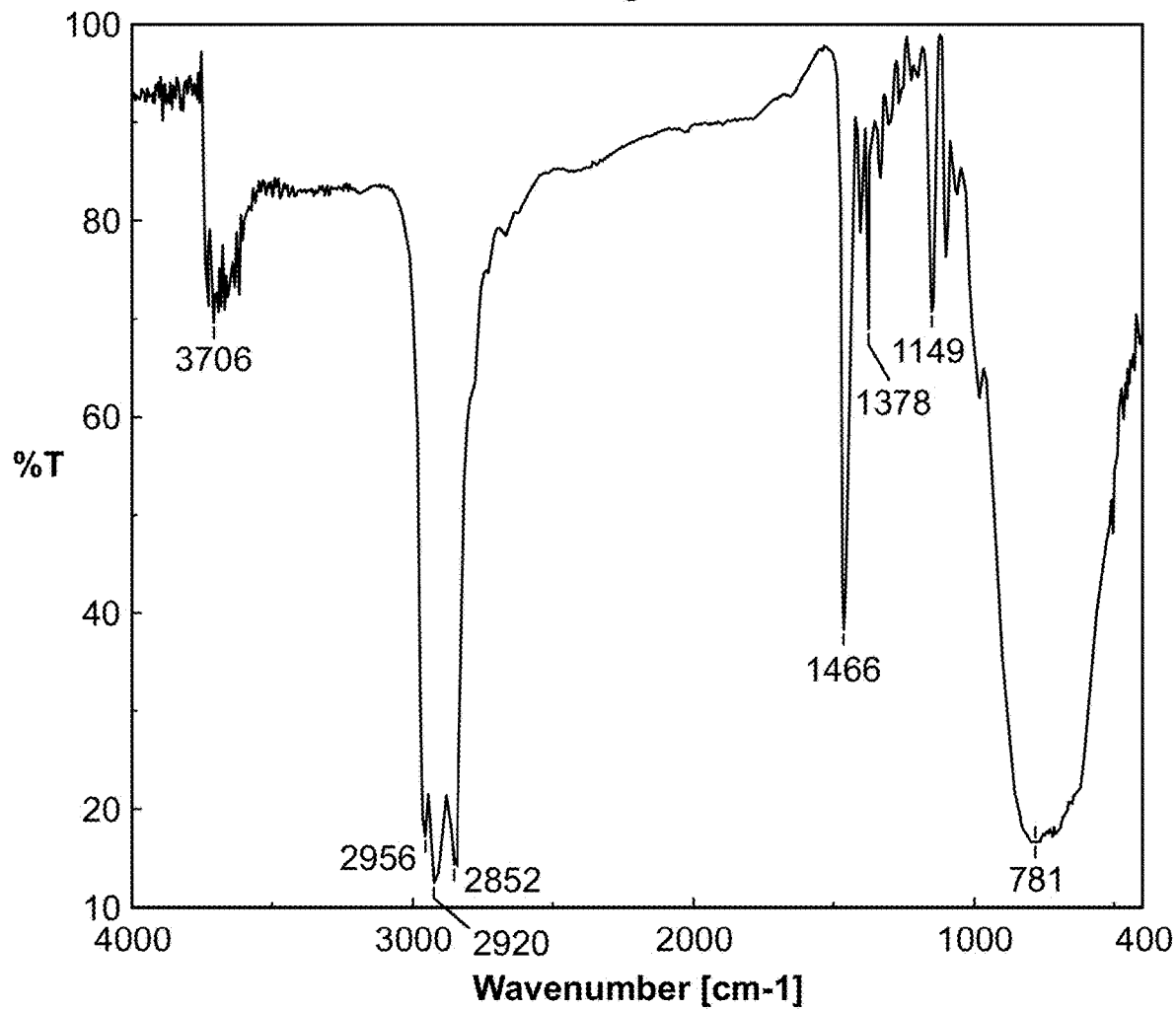
FIG. 2 is a transmission IR spectrum of a product obtained by drying a toluene solution of a tri-n-octyl aluminum hydrolyzate composition.

The solvent was removed from the obtained toluene solution containing a tri-n-octyl aluminum hydrolyzate composition by drying for a period of 30 minutes at 40° C. using an evaporator, and a spectrum such as that shown in FIG. 2 was obtained when the obtained composition was subjected to transmission IR measurements. A broad Al—O—Al vibration peak was observed in the region of 400 to 1500 $cm^{-1}$, and it was confirmed that Al—O—Al bonds were formed as a result of hydrolysis.

Synthesis Example 1-5

12.18 g of triisobutyl aluminum was added to 10.70 g of decane at 20° C. and thoroughly stirred. Next, 1.326 g of water ([water]/[triisobutyl aluminum]=1.2 (molar ratio)) was added dropwise at 20° C. over a period of 30 minutes using a syringe. Furthermore, an aging reaction was carried out by continuing to stir for 3 hours at 25° C., and a small quantity of a precipitated solid was removed by being decanted, thereby obtaining a decane solution containing a triisobutyl aluminum hydrolyzate composition.

Figure 3:
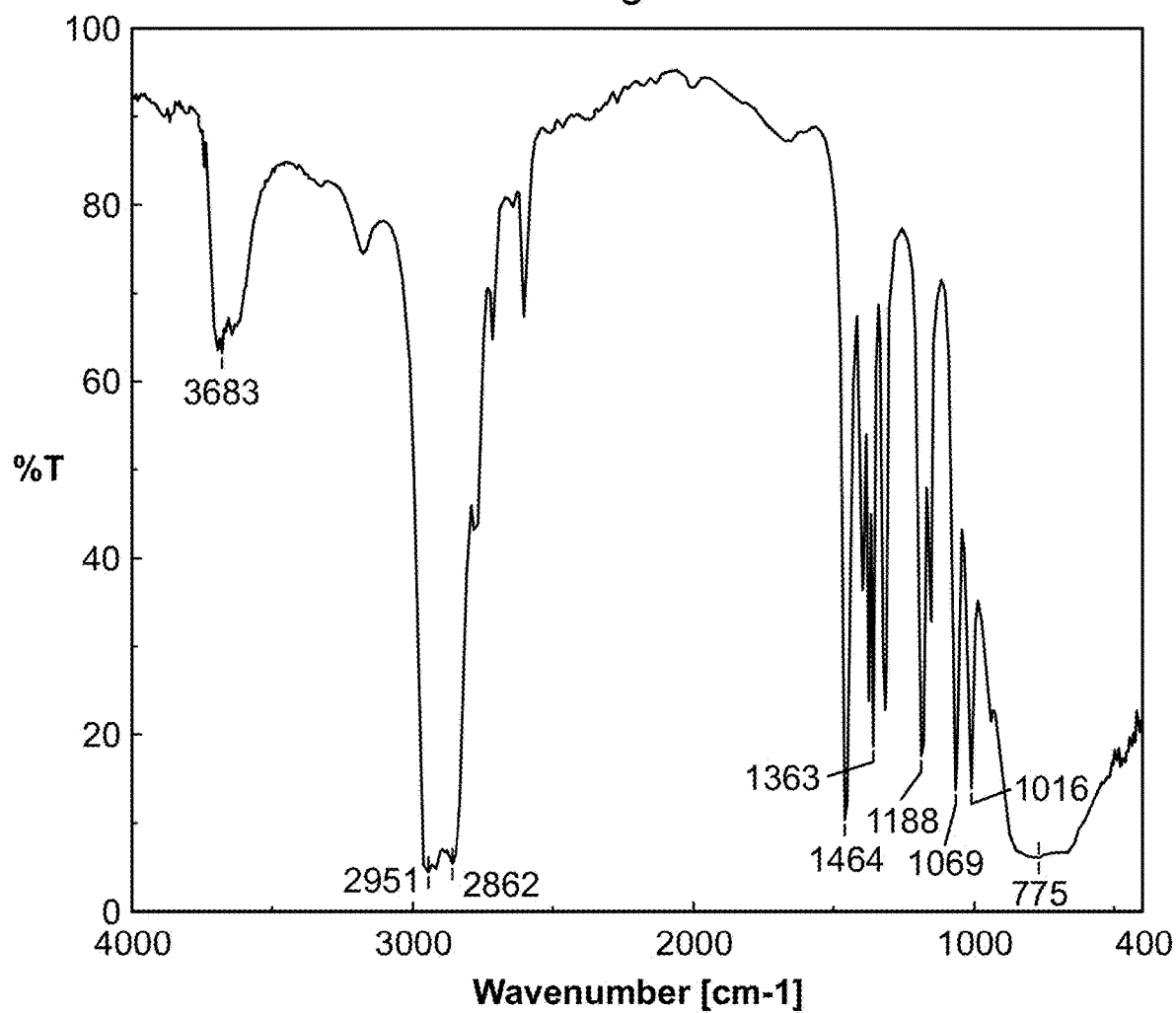
FIG. 3 is a transmission IR spectrum of a product obtained by drying a decane solution of a triisobutyl aluminum hydrolyzate composition.

The solvent was removed from the obtained decane solution containing a triisobutyl aluminum hydrolyzate composition by drying for a period of 30 minutes at 40° C. using an evaporator, and a spectrum such as that shown in FIG. 3 was obtained when the obtained composition was subjected to transmission IR measurements. A broad Al—O—Al vibration peak was observed in the region of 400 to 1500 $cm^{-1}$, and it was confirmed that Al—O—Al bonds were formed as a result of hydrolysis.

Synthesis Example 1-6

15.00 g of tri-n-octyl aluminum was added to 4.890 g of decane at 20° C. and thoroughly stirred. Next, 0.958 g of water ([water]/[tri-n-octyl aluminum]=1.3 (molar ratio)) was added dropwise at 20° C. over a period of 30 minutes using a syringe. Furthermore, an aging reaction was carried out by continuing to stir for 3 hours at 25° C., and a small quantity of a precipitated solid was removed by being decanted, thereby obtaining a decane solution containing a tri-n-octyl aluminum hydrolyzate composition.

Figure 4:
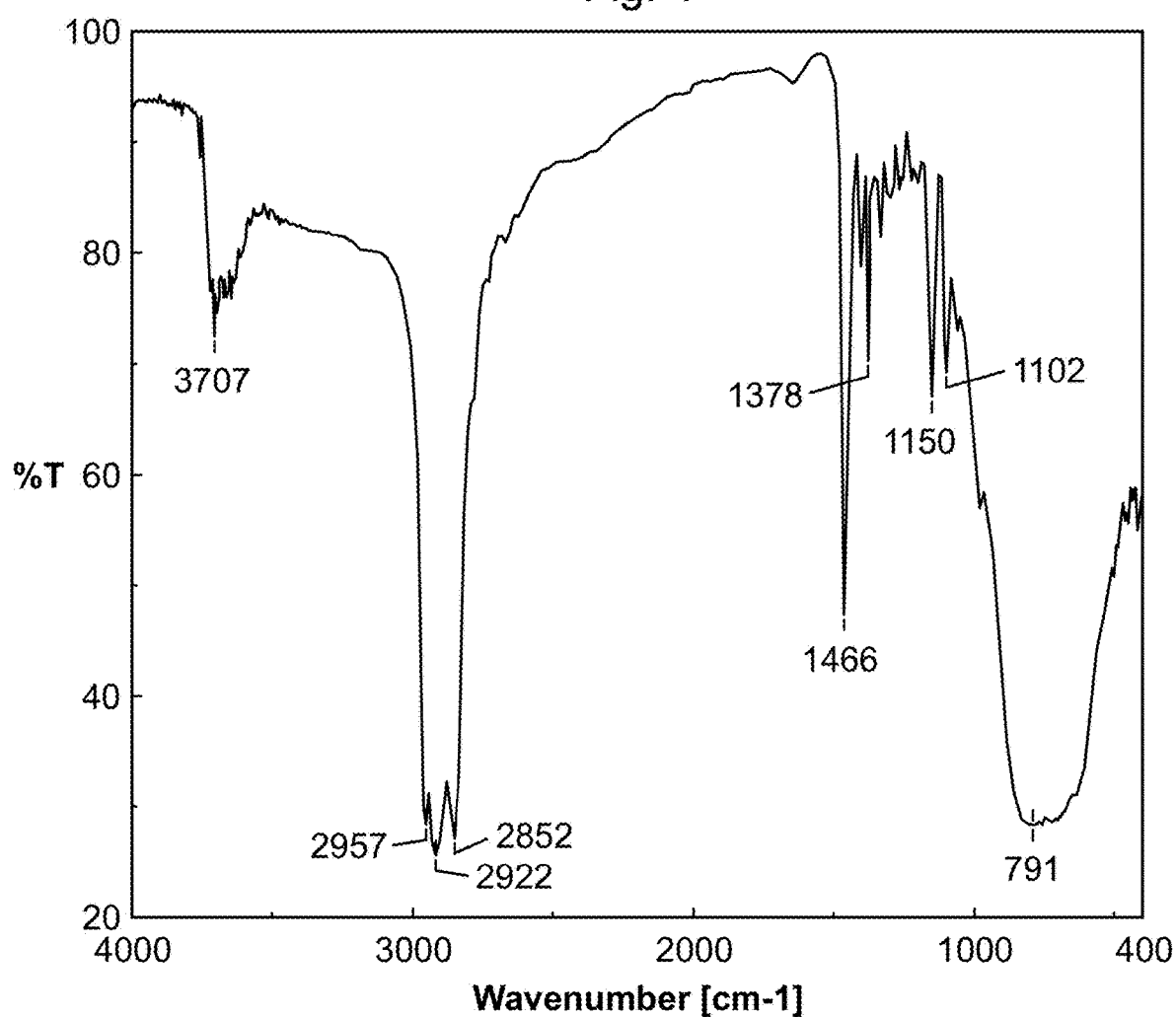
FIG. 4 is a transmission IR spectrum of a product obtained by drying a decane solution of a tri-n-octyl aluminum hydrolyzate composition.

The solvent was removed from the obtained decane solution containing a tri-n-octyl aluminum hydrolyzate composition by drying for a period of 30 minutes at 40° C. using an evaporator, and a spectrum such as that shown in FIG. 4 was obtained when the obtained composition was subjected to transmission IR measurements. A broad Al—O—Al vibration peak was observed in the region of 400 to 1500 $cm^{-1}$, and it was confirmed that Al—O—Al bonds were formed as a result of hydrolysis.

Reference Synthesis Example 1-1

12.09 g of triisobutyl aluminum was added to 10.00 g of tetrahydrofuran (hereinafter referred to as THF) at 20° C. and thoroughly stirred. Next, 1.208 g of water ([water]/[triisobutyl aluminum]=1.1 (molar ratio)) was added dropwise at 20° C. over a period of 30 minutes using a syringe. Furthermore, an aging reaction was carried out by continuing to stir for 3 hours at 25° C., and a THF solution containing a triisobutyl aluminum hydrolyzate composition was obtained.

Reference Synthesis Example 1-2

10.90 g of triethyl aluminum was added to 17.41 g of toluene at 20° C. and thoroughly stirred. Next, 1.891 g of water ([water]/[triisobutyl aluminum]=1.1 (molar ratio)) was added dropwise at 20° C. over a period of 30 minutes using a syringe. However, by-produced ethane gas was unexpectedly generated and white lumps were formed during the dropwise addition, and it could be easily understood that production would be difficult in cases where the scale of production was increased. Furthermore, an aging reaction was carried out by continuing to stir for 3 hours at 25° C., and a large quantity of a precipitated solid was removed by being decanted, thereby obtaining a toluene solution containing a triisobutyl aluminum hydrolyzate composition. If it is assumed that both active hydrogens in water reacted with triethyl aluminum, thereby generating ethane, and all of the ethane gas was removed as gas from the solution, the weight yield was 62%, which was significantly lower than in the other synthesis examples.

Example 1-1

100 µl of the toluene solution containing a triisobutyl aluminum hydrolyzate composition obtained in Synthesis Example 1-1 was added dropwise to a 15 mm-square glass substrate (Eagle XG available from Corning Incorporated) in an air atmosphere having a temperature of 25° C. and a relative humidity of approximately 40%, spin coated for 20 seconds at 4000 rpm using a spin coater, and then heated for 3 minutes at 80° C. to form a thin film.

Figure 5:
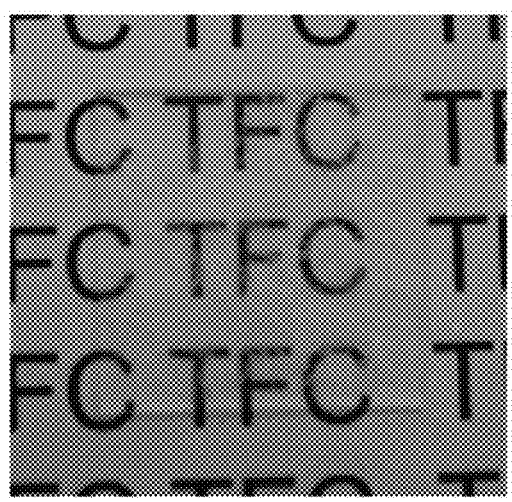
FIG. 5 is a photograph showing the appearance of the aluminum oxide thin film according to Synthesis Example 1-1.
Figure 6:
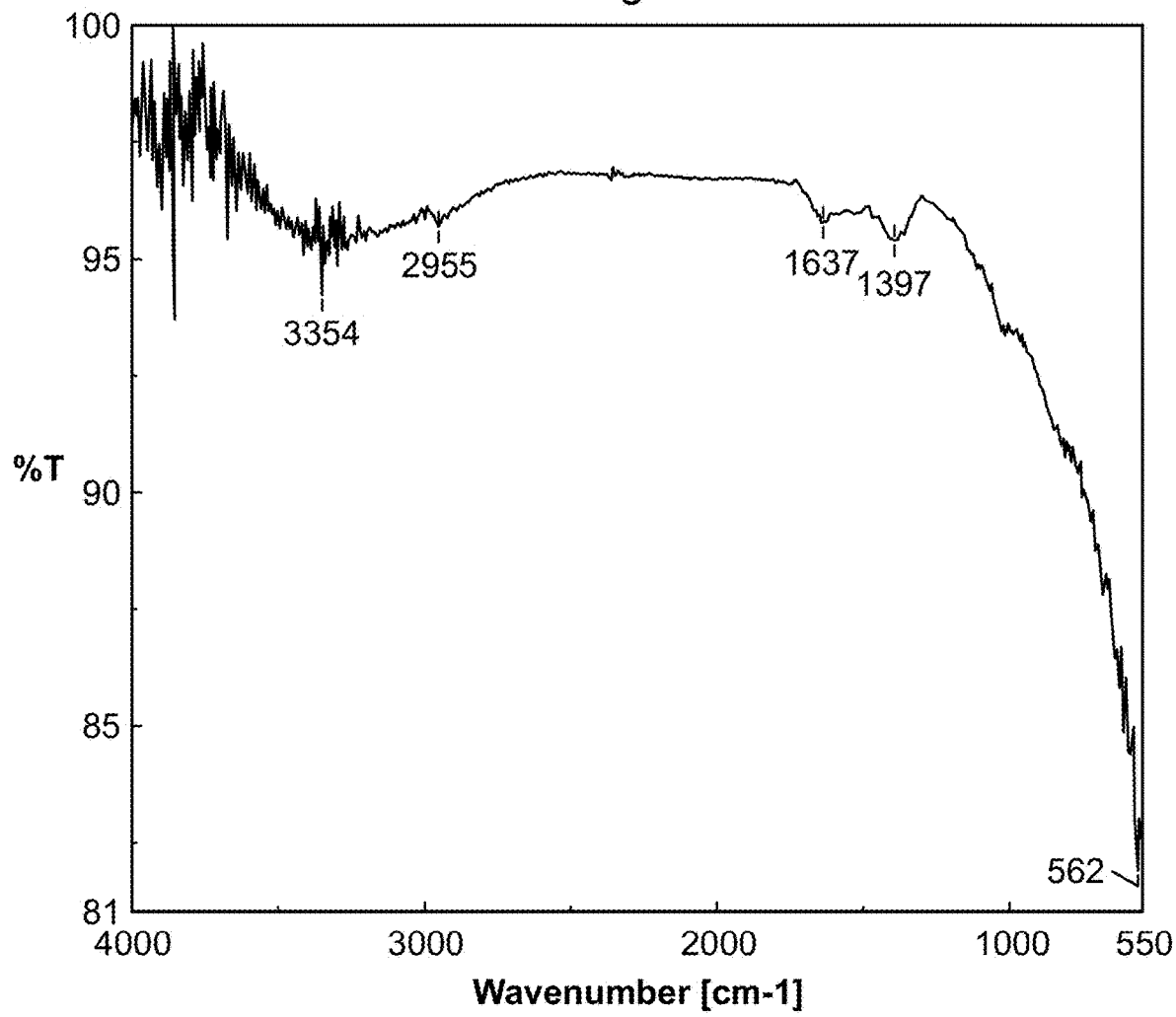
FIG. 6 is an ATR IR spectrum of the aluminum oxide thin film according to Synthesis Example 1-1.
Figure 7:
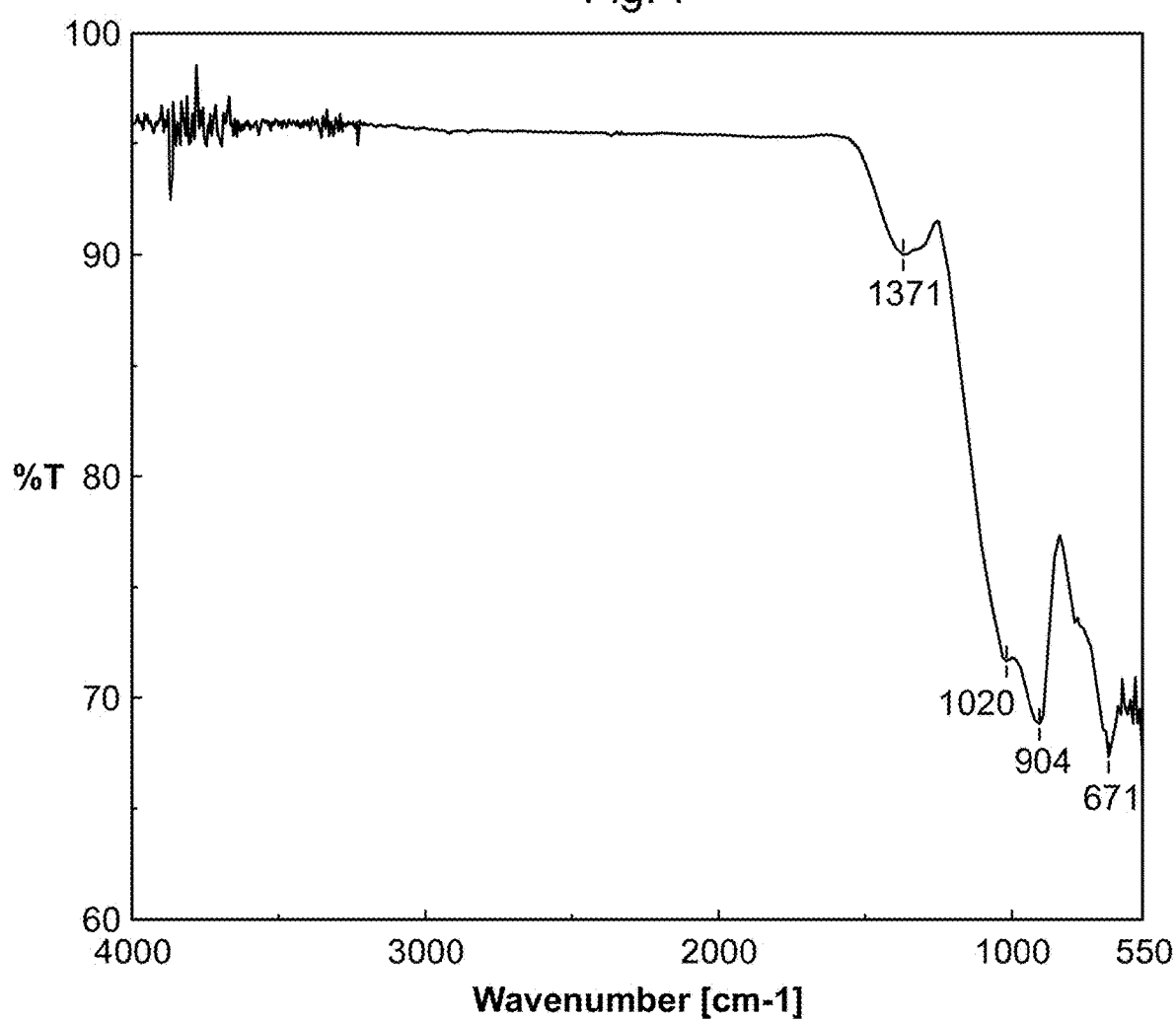
FIG. 7 is an ATR IR spectrum of a glass substrate (Eagle XG available from Corning Incorporated).

A thin film such as that shown in FIG. 5 was obtained, and a spectrum such as that shown in FIG. 6 was obtained when the thin film was subjected to IR measurements using an ATR method. A broad Al—O—Al vibration peak was observed in the region of 550 to 1500 $cm^{-1}$, and it was confirmed that Al—O—Al bonds were formed. Therefore, it was confirmed that an aluminum oxide thin film had been formed. An ATR IR spectrum of the glass substrate itself is shown in FIG. 7, and this is clearly different from FIG. 6.

Example 1-2

A thin film was formed in the same way as in Example 1-1, except that heating was carried out for 3 minutes at 200° C.

Figure 8:
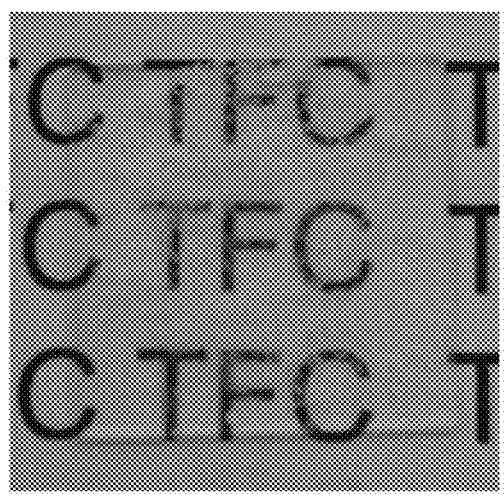
FIG. 8 is a photograph showing the appearance of an aluminum oxide thin film that uses Synthesis Example 1-1.
Figure 9:
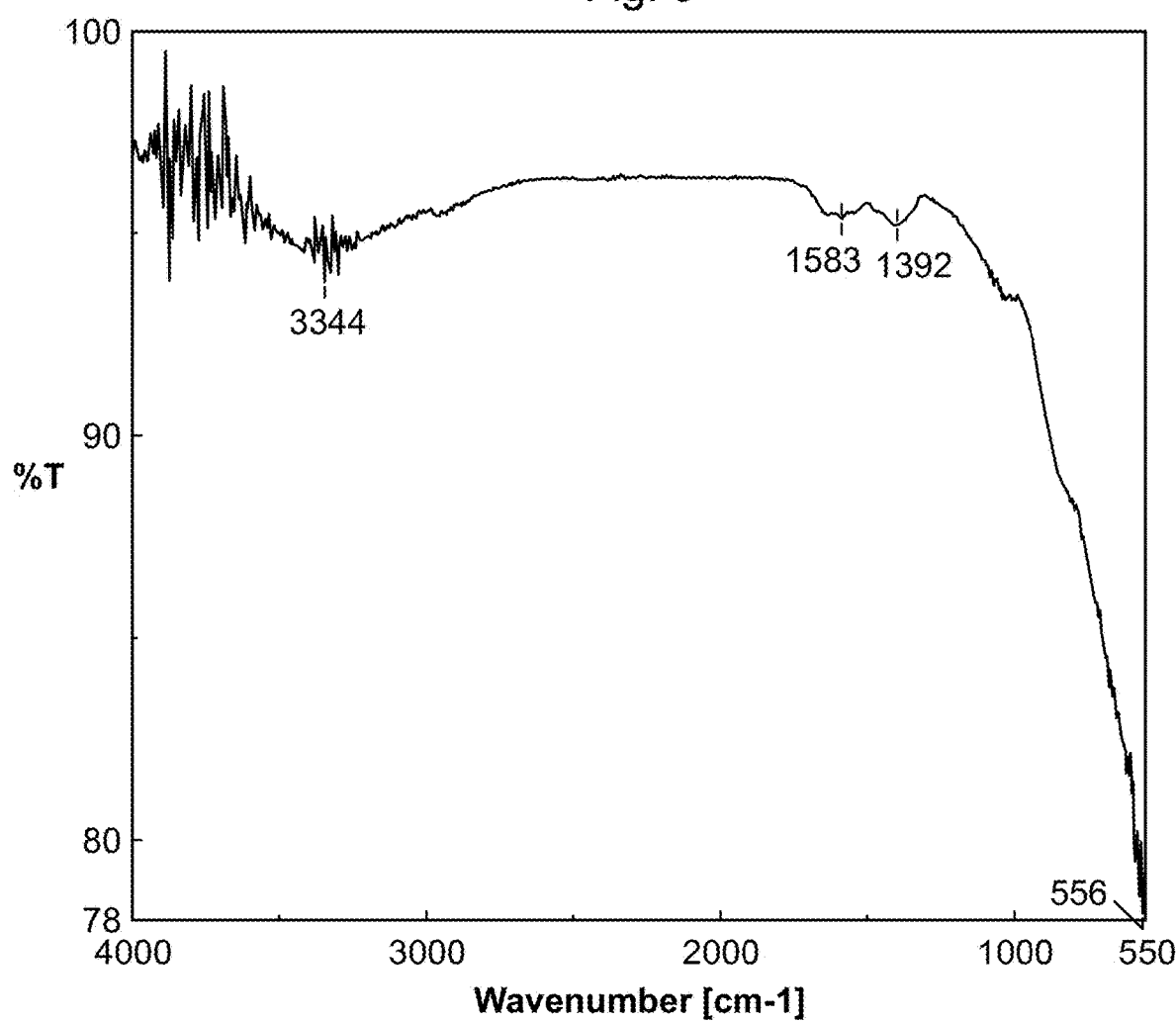
FIG. 9 is an ATR IR spectrum of an aluminum oxide thin film that uses Synthesis Example 1-1.

A thin film such as that shown in FIG. 8 was obtained, and a spectrum such as that shown in FIG. 9 was obtained when the thin film was subjected to IR measurements using an ATR method. A broad Al—O—Al vibration peak was observed in the region of 550 to 1500 $cm^{-1}$, and it was confirmed that an aluminum oxide thin film had been formed.

Example 1-3

A thin film was formed in the same way as in Example 1-1, except that the substrate was a 20 mm-square acrylic substrate (ACRYLITE EX available from Mitsubishi Rayon Co., Ltd.), and 150 µl of the solution was added dropwise.

Figure 10:
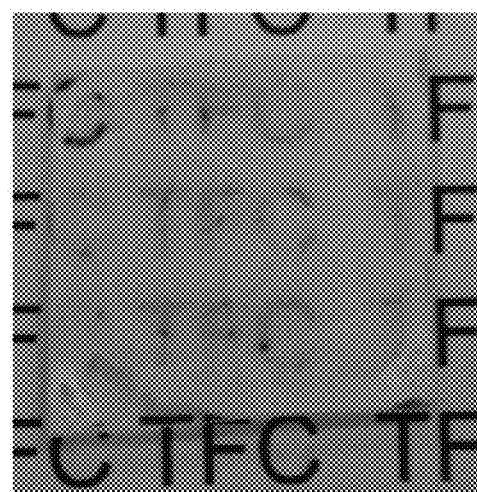
FIG. 10 is a photograph showing the appearance of an aluminum oxide thin film that uses Synthesis Example 1-1.
Figure 11:
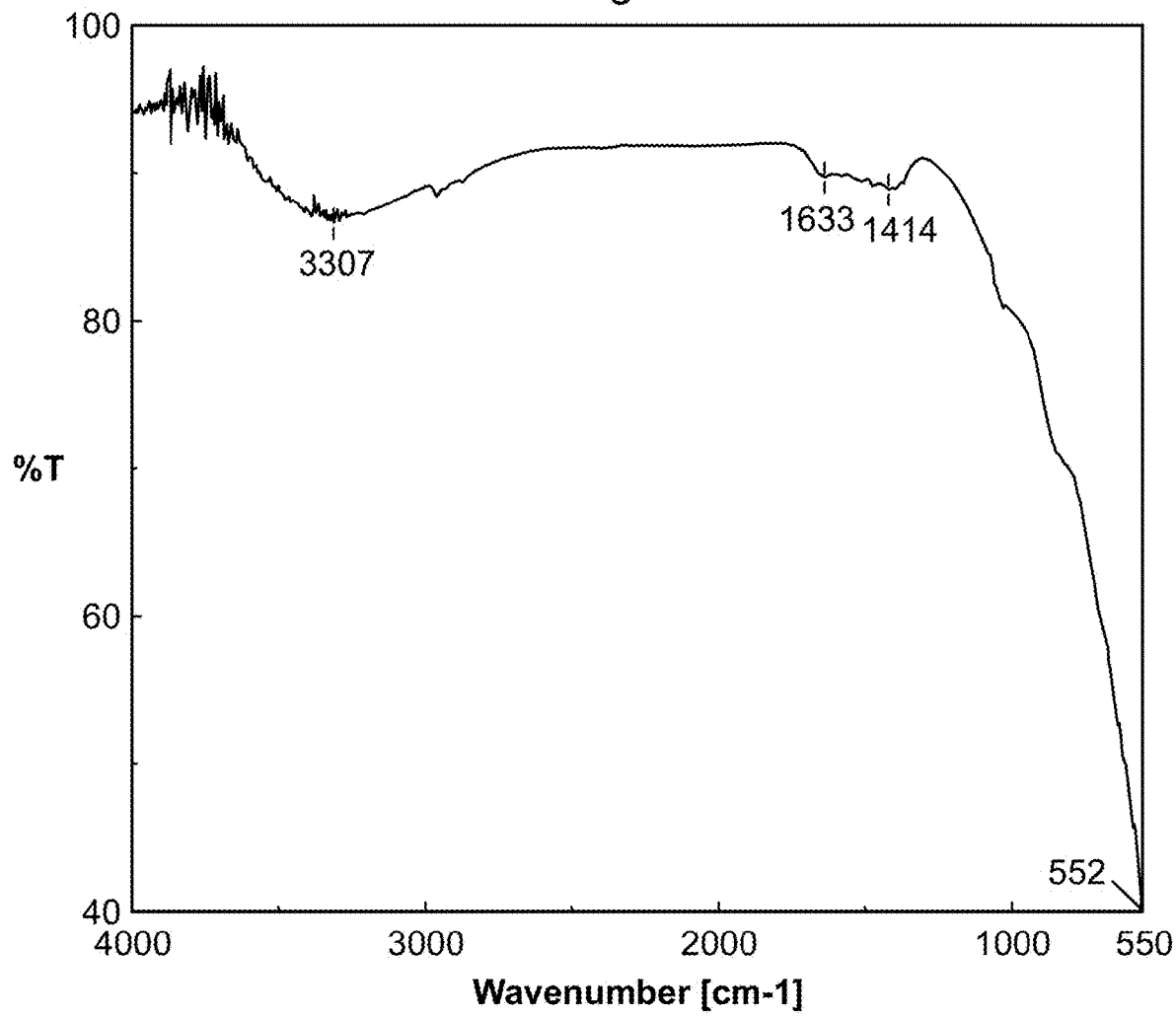
FIG. 11 is an ATR IR spectrum of an aluminum oxide thin film that uses Synthesis Example 1-1.
Figure 12:
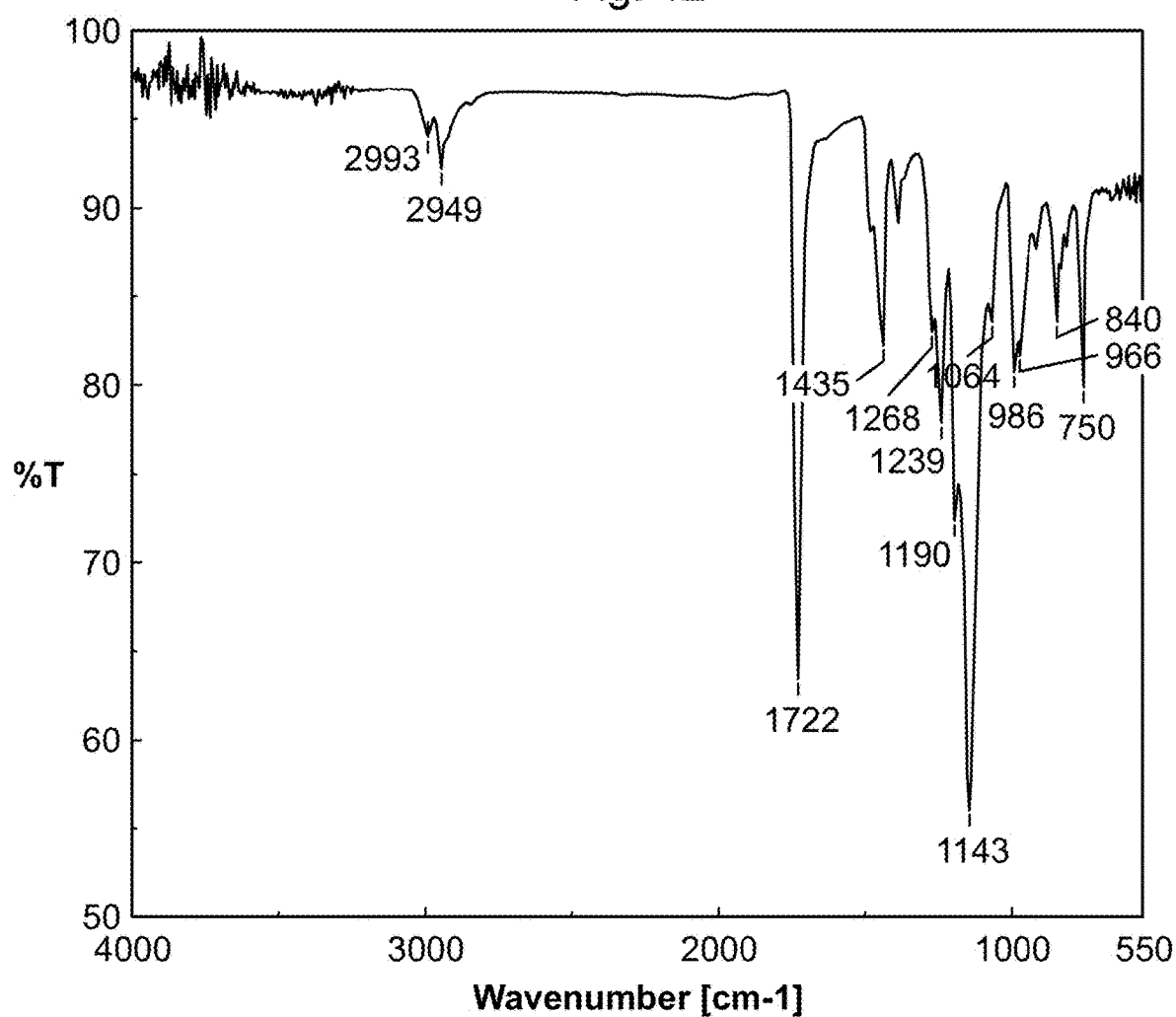
FIG. 12 is an ATR IR spectrum of an acrylic resin substrate (ACRYLITE EX available from Mitsubishi Rayon Co., Ltd.).

A thin film such as that shown in FIG. 10 was obtained, a spectrum such as that shown in FIG. 11 was obtained when the thin film was subjected to IR measurements using an ATR method, and it was confirmed that an aluminum oxide thin film had been formed. An ATR IR spectrum of the acrylic substrate itself is shown in FIG. 12, and this is clearly different from FIG. 11.

Example 1-4

150 μl of the toluene solution containing a tri-n-octyl aluminum hydrolyzate composition obtained in Synthesis Example 1-4 was added dropwise to a 15 mm-square glass substrate (Eagle XG available from Corning Incorporated) in an air atmosphere having a temperature of 25° C. and a relative humidity of approximately 40%, spin coated for 20 seconds at 4000 rpm using a spin coater, and then heated for 3 minutes at 80° C. to form a thin film.

Figure 13:
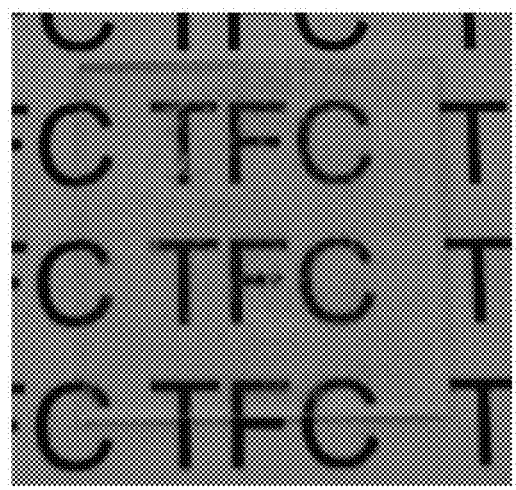
FIG. 13 is a photograph showing the appearance of an aluminum oxide thin film that uses Synthesis Example 1-4.
Figure 14:
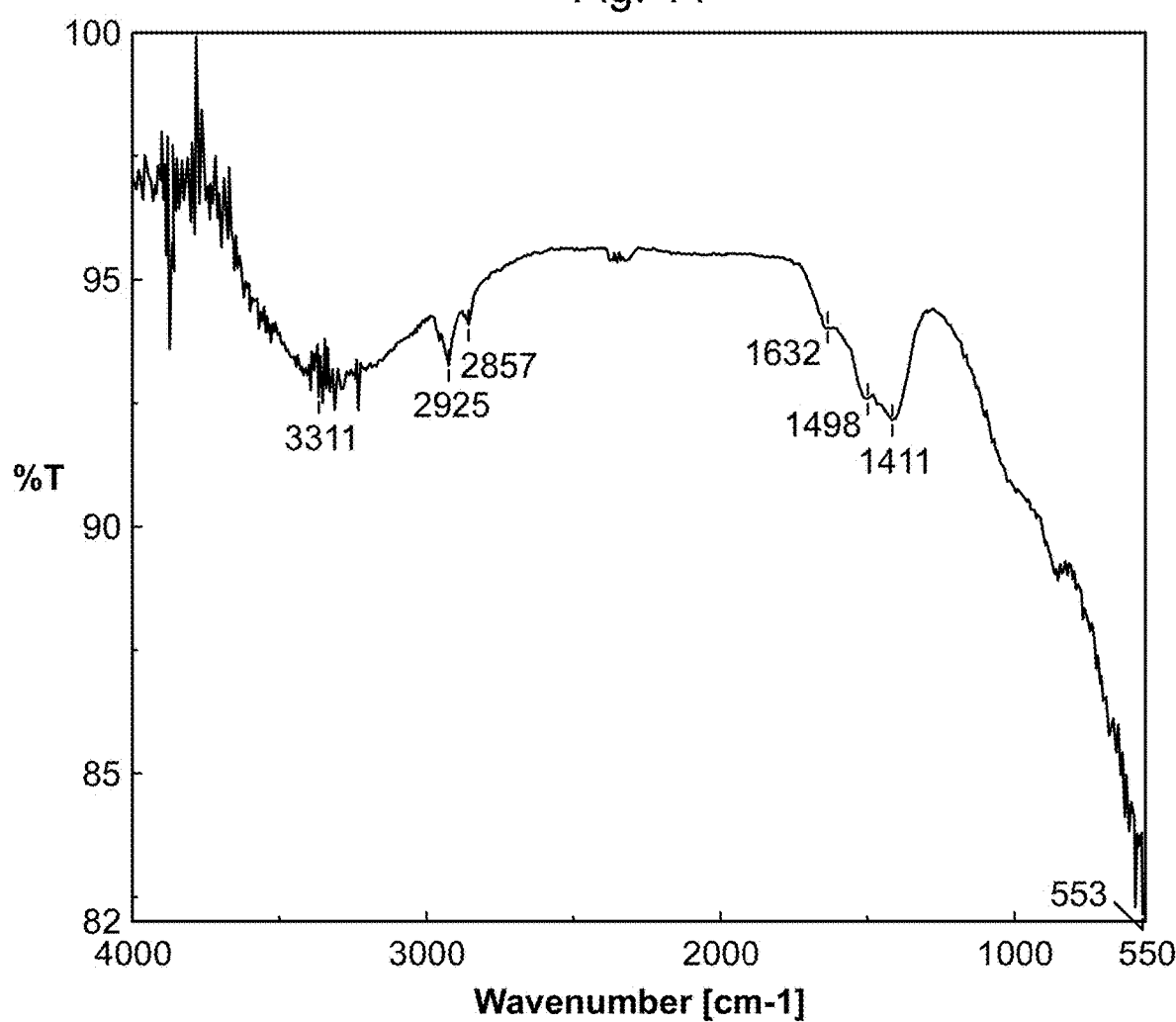
FIG. 14 is an ATR IR spectrum of an aluminum oxide thin film that uses Synthesis Example 1-4.

A thin film such as that shown in FIG. 13 was obtained, a spectrum such as that shown in FIG. 14 was obtained when the thin film was subjected to IR measurements using an ATR method, and it was confirmed that an aluminum oxide thin film had been formed.

Example 1-5

A thin film was formed in the same way as in Example 1-4, except that the substrate was a 20 mm-square acrylic resin substrate (ACRYLITE EX available from Mitsubishi Rayon Co., Ltd.), and 180 μl of the solution was added dropwise.

Figure 15:
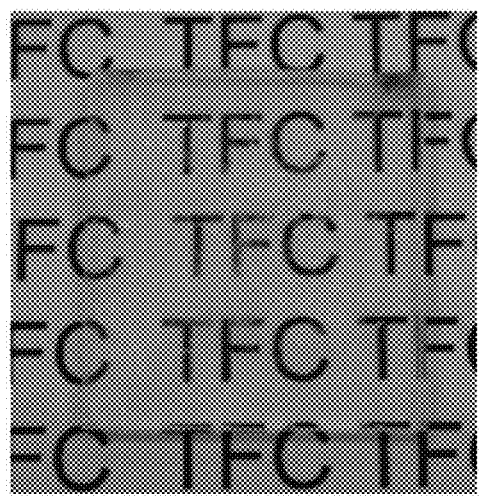
FIG. 15 is a photograph showing the appearance of an aluminum oxide thin film that uses Synthesis Example 1-4.
Figure 16:
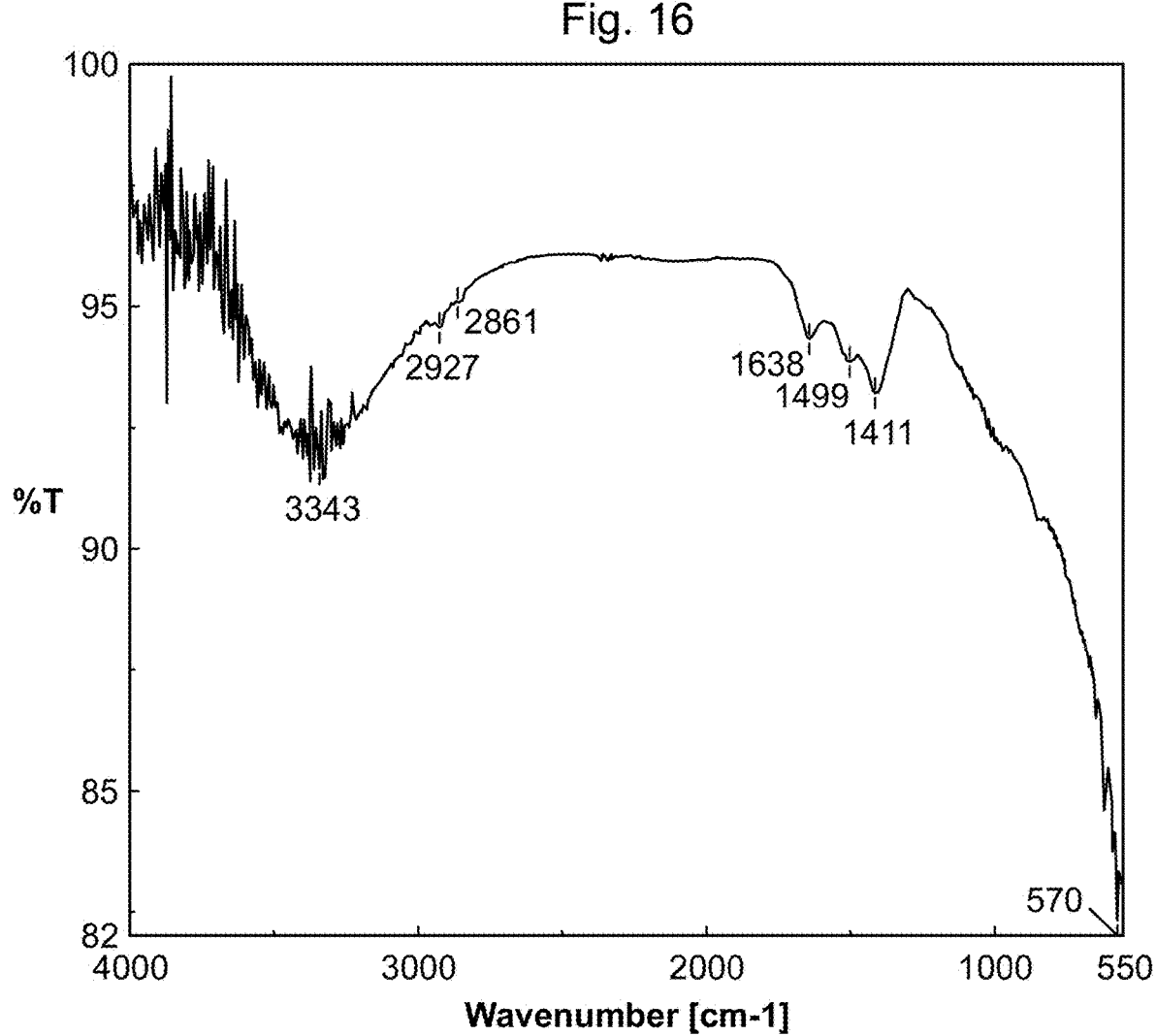
FIG. 16 is an ATR IR spectrum of an aluminum oxide thin film that uses Synthesis Example 1-4.

A thin film such as that shown in FIG. 15 was obtained, a spectrum such as that shown in FIG. 16 was obtained when the thin film was subjected to IR measurements using an ATR method, and it was confirmed that an aluminum oxide thin film had been formed.

Example 1-6

180 μl of the decane solution containing a triisobutyl aluminum hydrolyzate composition obtained in Synthesis Example 1-5 was added dropwise to a 20 mm-square acrylic resin substrate (ACRYLITE EX available from Mitsubishi Rayon Co., Ltd.) in an air atmosphere having a temperature of 25° C. and a relative humidity of approximately 40%, spin coated for 20 seconds at 4000 rpm using a spin coater, and then heated for 3 minutes at 80° C. to form a thin film.

Figure 17:
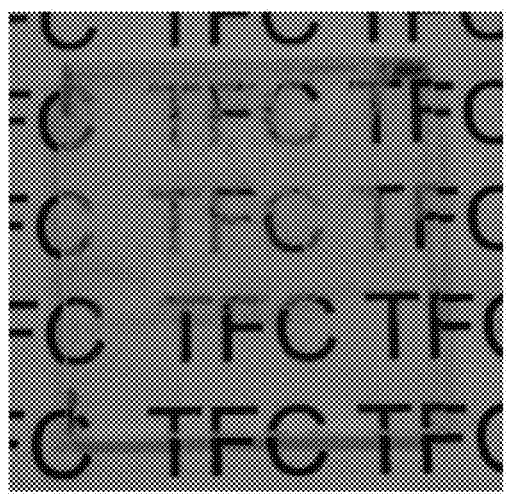
FIG. 17 is a photograph showing the appearance of an aluminum oxide thin film that uses Synthesis Example 1-5.
Figure 18:
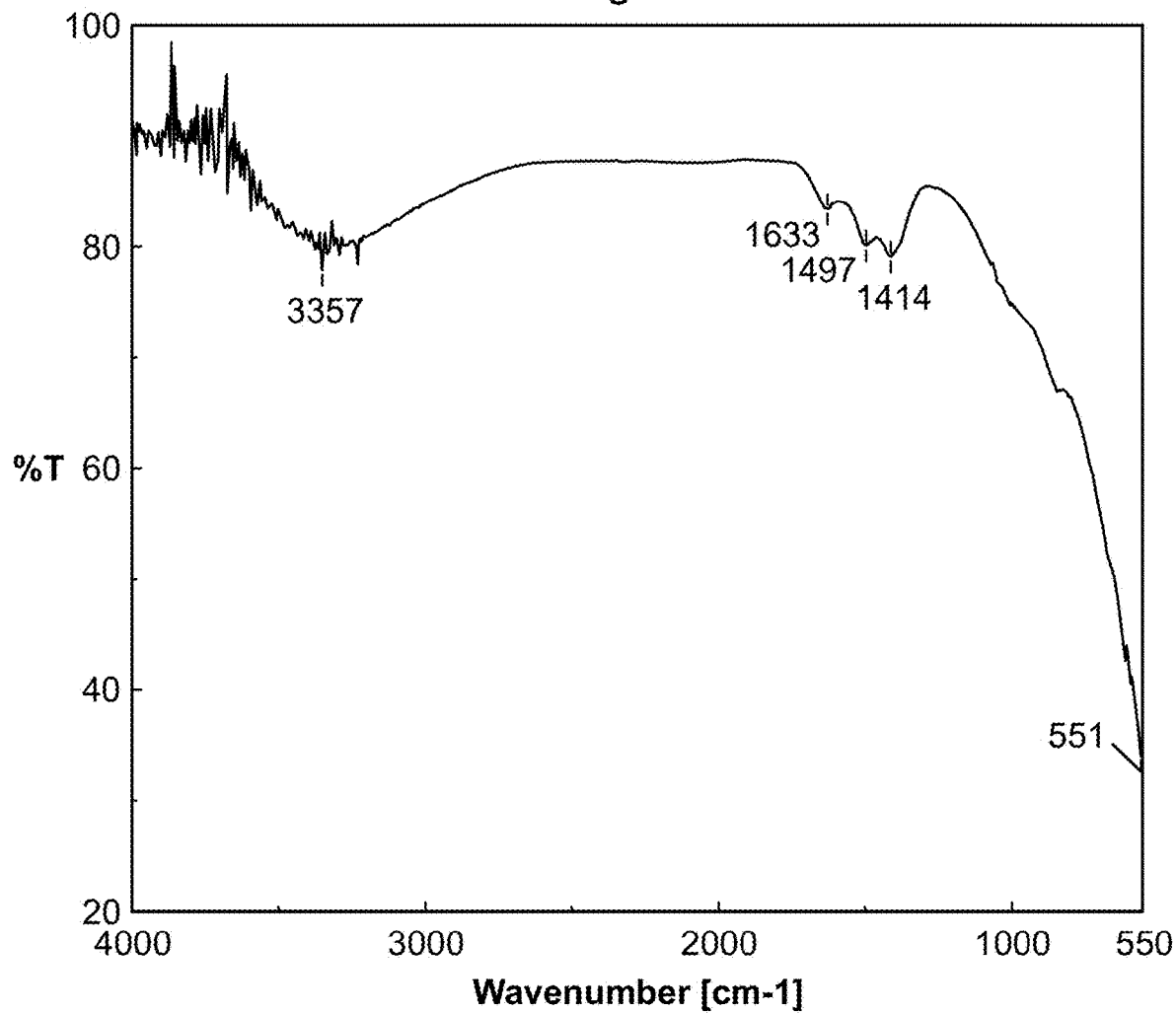
FIG. 18 is an ATR IR spectrum of an aluminum oxide thin film that uses Synthesis Example 1-5.

A thin film such as that shown in FIG. 17 was obtained, a spectrum such as that shown in FIG. 18 was obtained when the thin film was subjected to IR measurements using an ATR method, and it was confirmed that an aluminum oxide thin film had been formed.

Comparative Example 1-1

A thin film was formed in the same way as in Example 1-3, except that the solution was the THF solution containing a triisobutyl aluminum hydrolyzate composition obtained in Reference Synthesis Example 1-1.

Dissolution of the substrate was observed in that part of the substrate that was in contact with the solution and warping of the substrate also occurred. It can easily be understood that industrial applications involving use of larger quantities of the solution would be difficult, and it is clear that this cannot be used on thinner substrates such as films.

(Second Aspect of Present Invention)

Preparation of the solution containing an alkyl zinc partial hydrolyzate and of the solution containing an alkyl aluminum partial hydrolyzate in the present invention were carried out in a nitrogen gas atmosphere, with all solvents being dehydrated and degassed.

<Number of Moles of Trialkyl Aluminum>

The number of moles of trialkyl aluminum was calculated using the following formula.

[Number of moles of trialkyl aluminum] = [mass (g) of trialkyl aluminum introduced] / [molecular weight of trialkyl aluminum (114.17 in the case of triethyl aluminum)]

<Measurement of Physical Properties>

The polypropylene nanocomposite containing zinc oxide and polypropylene nanocomposite containing aluminum oxide of the present invention were subjected to transmission IR measurements using a FT-IR spectrophotometer ("FT/IR-6100" available from JASCO Corporation).

The polypropylene nanocomposite containing zinc oxide of the present invention was subjected to powder X-Ray diffraction (hereinafter abbreviated to XRD) measurements using a powder X-Ray diffraction apparatus ("SmartLab" available from Rigaku Corporation).

The polypropylene nanocomposite containing zinc oxide and polypropylene nanocomposite containing aluminum oxide of the present invention were cut to approximately 100 nm using a microtome equipped with a diamond knife and then subjected to TEM measurements using a transmission electron microscope ("H-7100" available from Hitachi, Ltd.).

Synthesis Example 2-1

8.98 g of diethyl zinc (available from Tosoh Finechem Corporation) was added to 45.0 g of toluene at 20° C. and thoroughly stirred. Next, the obtained mixture was cooled to −15° C., and 7.857 g of a tetrahydrofuran (hereinafter referred to as THF) solution containing 10 wt % of water ([water]/[diethyl zinc]=0.6 (molar ratio)) was added dropwise at −15° C. over a period of 60 minutes using a syringe. After increasing the temperature to 25° C., an aging reaction was carried out by continuing to stir for 3 hours at 25° C., and a small quantity of a precipitated solid was removed by being decanted, thereby obtaining a toluene solution containing an ethyl zinc partial hydrolyzate.

Synthesis Example 2-2

21.61 g of triethyl aluminum was added to 45.00 g of toluene at 20° C. and thoroughly stirred. Next, the obtained mixture was cooled to −15° C., and 11.09 g of a THF solution containing 10 wt % of water ([water]/[triethyl aluminum]=1.0 (molar ratio)) was added dropwise at −15° C. over a period of 60 minutes using a syringe. After increasing the temperature to 25° C., an aging reaction was carried out by continuing to stir for 3 hours at 25° C., and a small quantity of a precipitated solid was removed by being decanted, thereby obtaining a toluene solution containing an ethyl aluminum partial hydrolyzate.

Example 2-1

Propylene was polymerized using a Ziegler-Natta catalyst (TiCl$_4$/MgCl$_2$/dibutyl phthalate type). The obtained propylene homopolymer had a density of 0.9 g/cm$^3$ and a weight average molecular weight of 2.6×10$^5$.

30 g of the propylene homopolymer was mixed with 0.3 g (corresponding to 1.0 wt %) of an antioxidant (ADK STAB AO-50 available from ADEKA Corporation). After thoroughly stirring the mixture, 15.79 g of the toluene solution containing an ethyl zinc partial hydrolyzate of Synthesis Example 1 (calculated from [conversion concentration of zinc oxide in the solution containing an alkyl zinc partial hydrolyzate (10 wt %)]/100×[weight of alkyl zinc partial hydrolyzate]=[total quantity of nanocomposite (weight of polypropylene (30 g)+weight of converted zinc oxide (10 wt % of weight of alkyl zinc partial hydrolyzate))]×[concentration of zinc oxide in nanocomposite (5 wt %)]/100) was introduced and thoroughly stirred. By stirring the thus formed mixture for 12 hours at 50° C. in a nitrogen atmosphere, the propylene homopolymer powder was impregnated with the toluene solution containing an ethyl zinc partial hydrolyzate.

The solvent was removed by vacuum drying the impregnated propylene homopolymer powder for 6 hours.

The propylene homopolymer powder, from which the solvent had been removed, was melted and heated for 15 minutes at 100 rpm in a mixer at 180° C., thereby producing a polypropylene nanocomposite containing zinc oxide. Next, the nanocomposite, which had been heated and melted for 6 minutes at 230° C., was pressed using a sheet molding machine, and then quenched, thereby forming a sheet.

Figure 19:
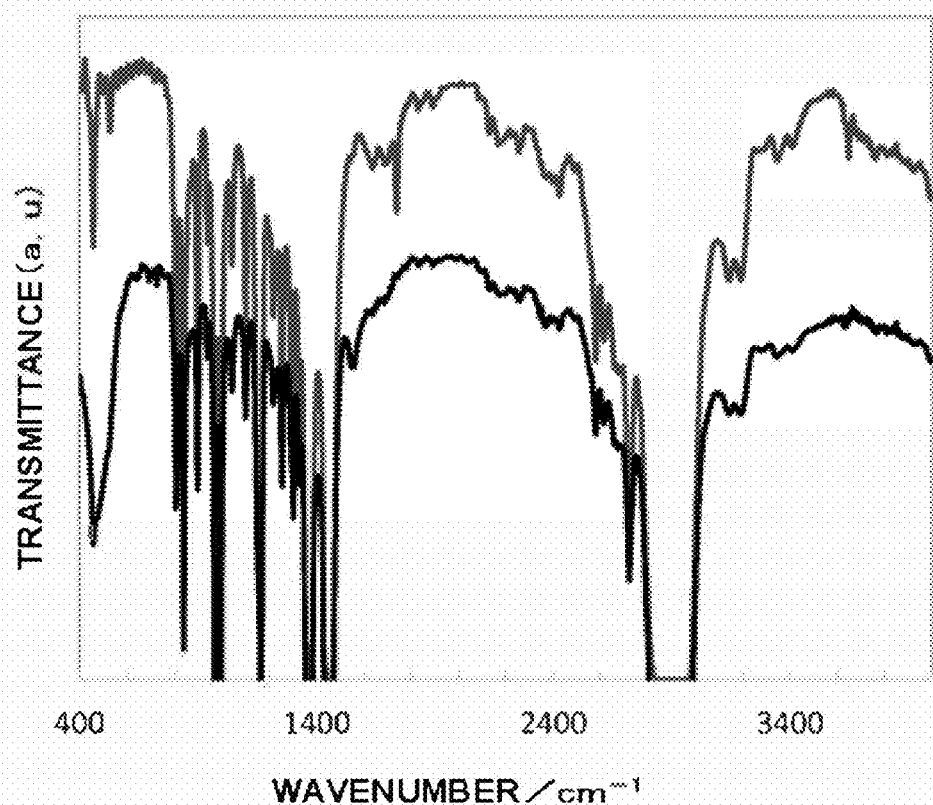
FIG. 19 is a FT-IR spectrum of a polypropylene nanocomposite produced in Example 2-1, which contains 5 wt % of zinc oxide (the top spectrum is a spectrum of a propylene homopolymer powder only, and the second spectrum is a spectrum of Example 2-1).

A spectrum such as that shown in FIG. 19 was obtained when the sheet was subjected to IR measurements. In the region of 3900 cm$^{-1}$, the top spectrum is a spectrum of a propylene homopolymer powder only, and the second spectrum is a spectrum of Example 2-1. A broad Zn—O—Zn vibration peak was observed in the region of 400 to 800 cm$^{-1}$, and it was confirmed that zinc oxide particles had been formed.

Figure 20:
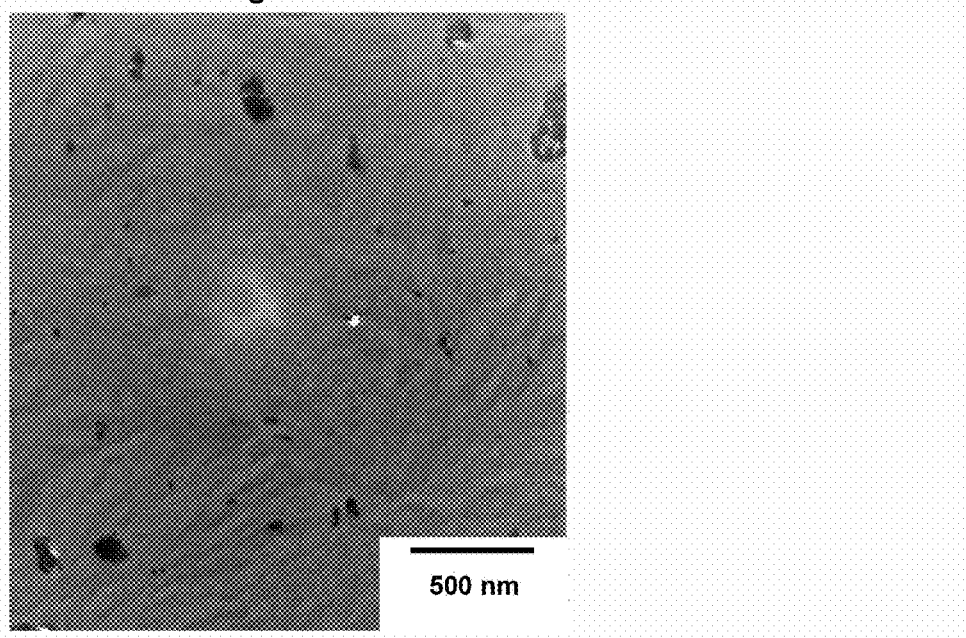
FIG. 20 is a TEM image of a polypropylene nanocomposite produced in Example 2-1, which contains 5 wt % of zinc oxide.

A TEM image such as that shown in FIG. 20 was obtained when the sheet was subjected to TEM measurements. The presence of zinc oxide could be confirmed. The average particle diameter was calculated from the particle diameters of 20 average particles in the image, and found to be 39 nm.

Figure 21:
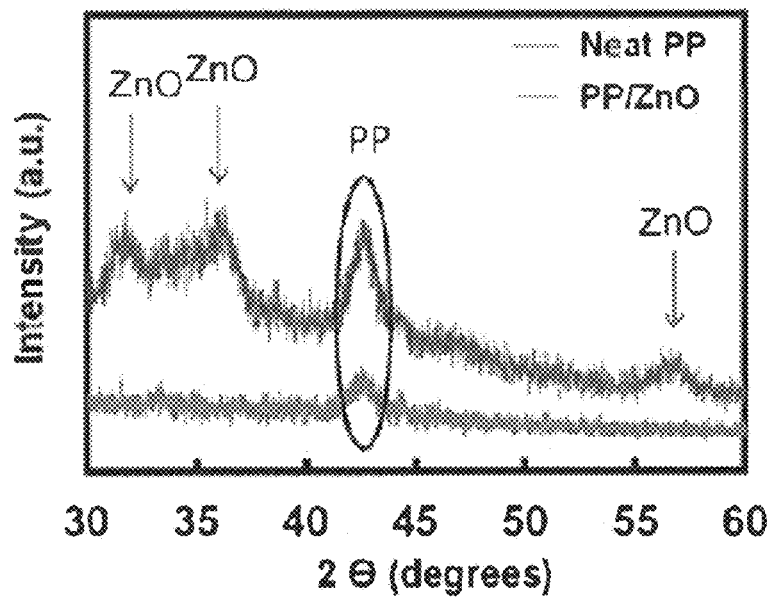
FIG. 21 is a powder X-Ray diffraction spectrum of a polypropylene nanocomposite produced in Example 2-1, which contains 5 wt % of zinc oxide.

A spectrum such as that shown in FIG. 21 was obtained when the sheet was subjected to XRD measurements. The upper spectrum is for Example 2-1, and the lower spectrum is for the propylene homopolymer powder only. Zinc oxide diffraction peaks could be observed.

Example 2-2

A polypropylene nanocomposite containing zinc oxide was formed in the same way as in Example 2-1, except that a moisture supply step in which a reaction with water vapor was carried out for 24 hours at 80° C. was introduced between the solvent removal step and the melting and heating step, and a sheet was then formed in the same way as in Example 2-1.

Figure 22:
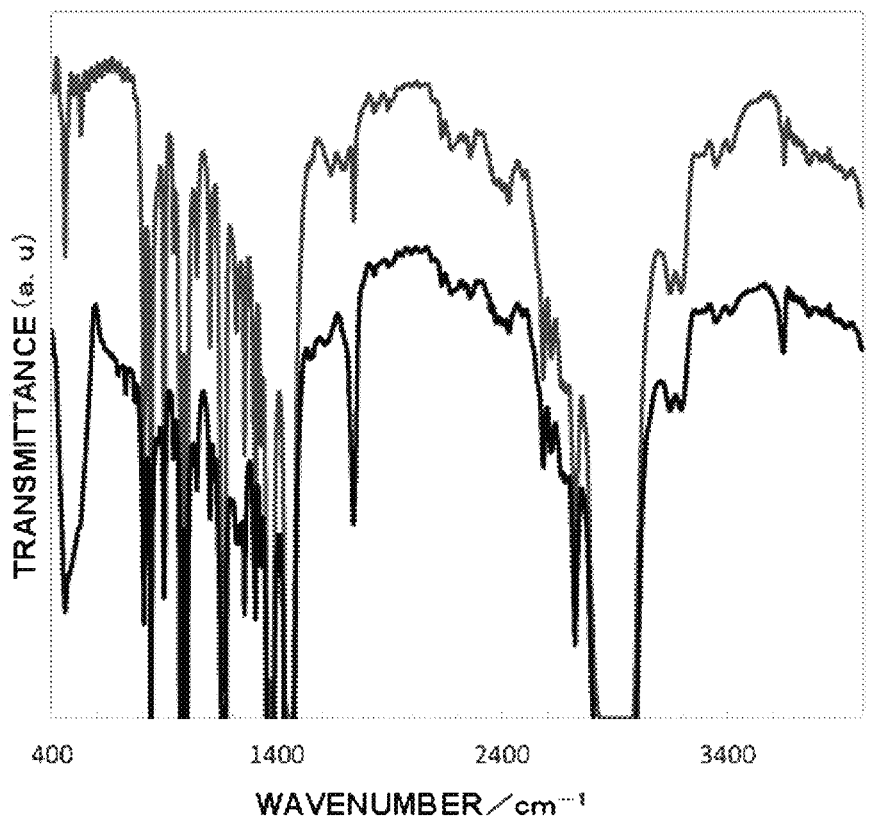
FIG. 22 is a FT-IR spectrum of a polypropylene nanocomposite produced in Example 2-2, which contains 5 wt % of steam-treated zinc oxide (the top spectrum is a spectrum of a propylene homopolymer powder only, and the second spectrum is a spectrum of Example 2-2).

A spectrum such as that shown in FIG. 22 was obtained when the sheet was subjected to IR measurements. In the region of 3900 cm$^{-1}$, the top spectrum is a spectrum of a propylene homopolymer powder only, and the second spectrum is a spectrum of Example 2-2. A broad Zn—O—Zn vibration peak was observed in the region of 400 to 800 cm$^{-1}$, and it was confirmed that zinc oxide particles had been formed.

Figure 23:
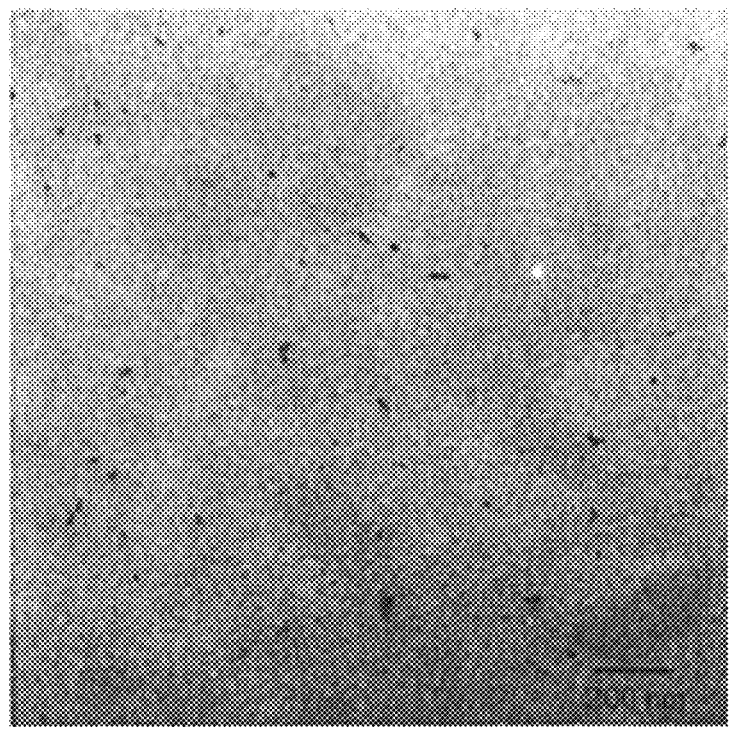
FIG. 23 is a TEM image of a nanocomposite produced in Example 2-2, which contains 5 wt % of steam-treated zinc oxide.

A TEM image such as that shown in FIG. 23 was obtained when the sheet was subjected to TEM measurements. The presence of zinc oxide could be confirmed. The average particle diameter was calculated from the particle diameters of 20 average particles in the image, and found to be 43 nm.

Figure 24:
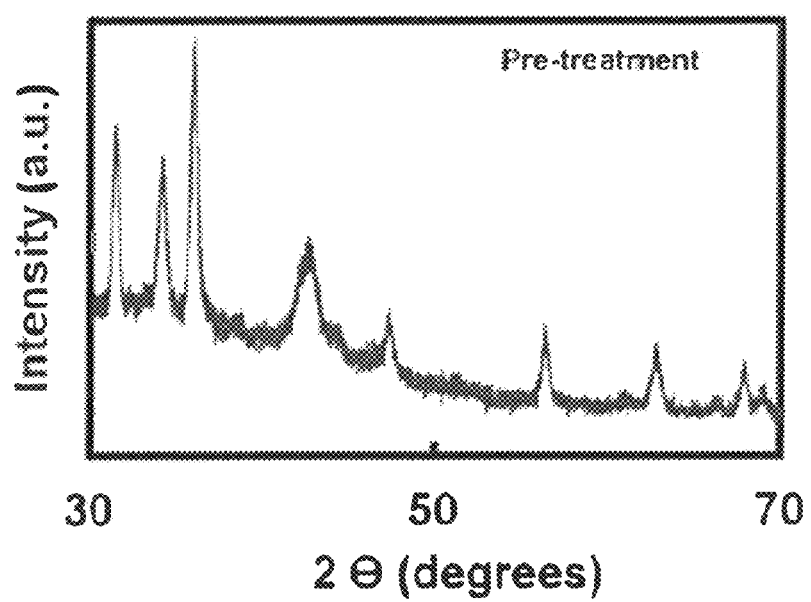
FIG. 24 is a powder X-Ray diffraction spectrum of a nanocomposite produced in Example 2-2, which contains 5 wt % of steam-treated zinc oxide.

A spectrum such as that shown in FIG. 24 was obtained when the sheet was subjected to XRD measurements. Zinc oxide diffraction peaks could be observed. The diffraction peaks were sharper than those for Example 2-1, in which a moisture supply step was not included, showing that the crystallinity of the zinc oxide had improved.

Example 2-3

A polypropylene nanocomposite containing aluminum oxide was formed in the same way as in Example 2-1, except that the toluene solution containing an ethyl zinc partial hydrolyzate of Synthesis Example 2-1 was replaced with the toluene solution containing an ethyl aluminum partial hydrolyzate of Synthesis Example 2-2.

Figure 25:
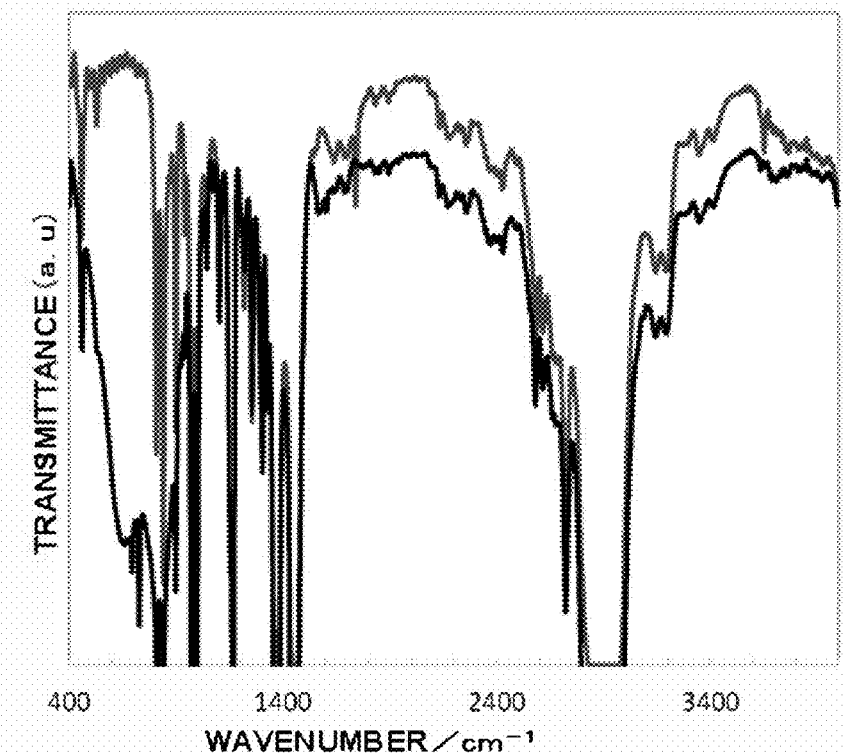
FIG. 25 is a FT-IR spectrum of a polypropylene nanocomposite produced in Example 2-3, which contains 5 wt % of aluminum oxide (the top spectrum is a spectrum of a propylene homopolymer powder only, and the second spectrum is a spectrum of Example 2-3).

A spectrum such as that shown in FIG. 25 was obtained when the sheet was subjected to IR measurements. In the region of 3600 cm$^{-1}$, the top spectrum is a spectrum of a propylene homopolymer powder only, and the second spectrum is a spectrum of Example 2-3. A broad Al—O—Al vibration peak was observed in the region of 400 to 1000 cm$^{-1}$, and it was confirmed that aluminum oxide thin particles had been formed.

Figure 26:
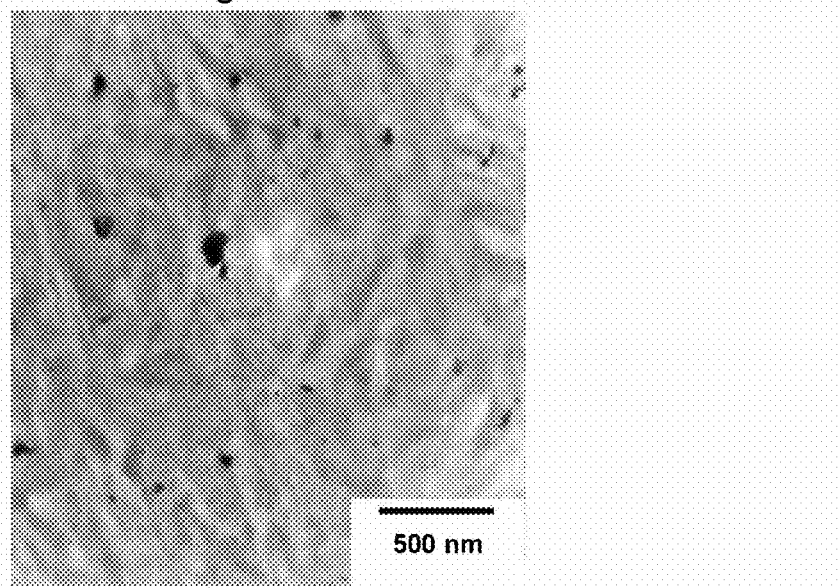
FIG. 26 is a TEM image of a polypropylene nanocomposite produced in Example 2-3, which contains 5 wt % of aluminum oxide.

A TEM image such as that shown in FIG. 26 was obtained when the sheet was subjected to TEM measurements. The presence of aluminum oxide could be confirmed. The average particle diameter was calculated from the particle diameters of 20 average particles in the image, and found to be 72 nm.

Example 2-4

A polypropylene nanocomposite containing aluminum oxide was formed in the same way as in Example 2-2, except that the 15.79 g of the toluene solution containing an ethyl zinc partial hydrolyzate of Synthesis Example 2-1 was replaced with 15.79 g of the toluene solution containing an ethyl aluminum partial hydrolyzate of Synthesis Example 2-2 (calculated from [conversion concentration of zinc oxide in the solution containing an alkyl zinc partial hydrolyzate (10 wt %)]/100×[weight of alkyl zinc partial hydrolyzate]= [total quantity of nanocomposite (weight of polypropylene (30 g)+weight of converted zinc oxide (10 wt % of weight of alkyl zinc partial hydrolyzate))]×[concentration of zinc oxide in nanocomposite (5 wt %)]/100), and a sheet was then formed in the same way as in Example 2-1.

Figure 27:
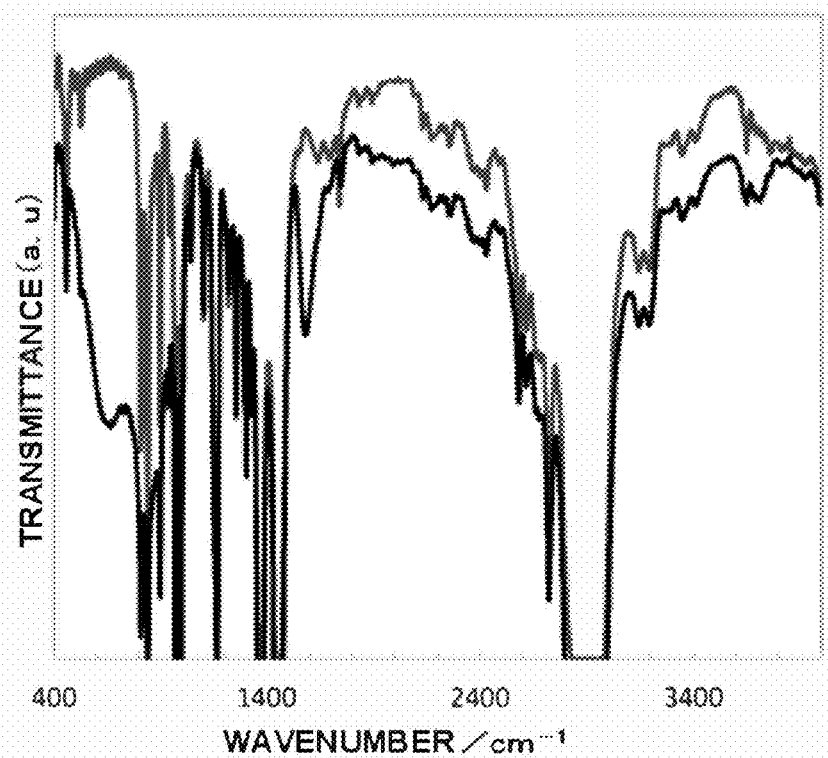
FIG. 27 is a FT-IR spectrum of a nanocomposite produced in Example 2-4, which contains 5 wt % of steam-treated aluminum oxide (the top spectrum is a spectrum of a propylene homopolymer powder only, and the bottom spectrum is a spectrum of Example 2-4).

A spectrum such as that shown in FIG. 27 was obtained when the sheet was subjected to IR measurements. In the region of 3900 cm$^{-1}$, the top spectrum is a spectrum of a propylene homopolymer powder only, and the bottom spectrum is a spectrum of Example 2-4. Broad Al—OH vibration peaks were observed in the region of 1600 cm$^{-1}$ and at 3000 to 3700 cm$^{-1}$, and it was confirmed that aluminum hydroxide particles had been formed.

Figure 28:
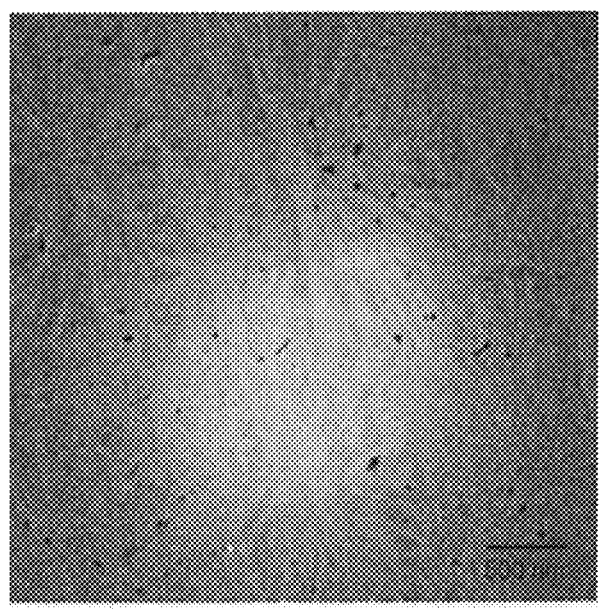
FIG. 28 is a TEM image of a nanocomposite produced in Example 2-4, which contains 5 wt % of steam-treated aluminum oxide.

A TEM image such as that shown in FIG. 28 was obtained when the sheet was subjected to TEM measurements. The presence of aluminum hydroxide could be confirmed. The average particle diameter was calculated from the particle diameters of 20 average particles in the image, and found to be 75 nm.

INDUSTRIAL APPLICABILITY

The aluminum oxide of the first aspect of the present invention can be used to impart heat-dissipating properties, heat resistance, barrier properties against air and moisture, an anti-reflection effect, an anti-static effect, an anti-fogging effect or abrasion resistance, as a resin filler for imparting thermal conductivity, as a filler for adjusting the refractive index, reflectance, workability, flexibility and the like of a resin, as a sintering raw material for fine ceramics, and the like.

The polyolefin-based nanocomposite of the second aspect of the present invention can be used as a replacement product for materials of existing products that require stability, abrasion resistance, increased refractive index, stability against ultraviolet radiation, electrical conductivity ultraviolet radiation absorption or antibacterial properties, or as a replacement product for materials of products that require adjustment of thermal conductivity, abrasion resistance or refractive index.

The invention claimed is:

1. A method for producing a composition for forming a particulate or film-shaped aluminum oxide, which is comprised of a solution containing an alkyl aluminum partial hydrolyzate, the method comprising: adding water to a solution containing an alkyl aluminum compound and a non-polar organic solvent at a molar ratio of 0.5 to 1.4 relative to aluminum in the alkyl aluminum compound to produce the solution containing the alkyl aluminum partial hydrolyzate, wherein the alkyl aluminum compound is comprised of a trialkyl aluminum or a mixture thereof, wherein the alkyl groups may be the same or different and have 7 to 12 carbon atoms.

2. The production method according to claim 1, wherein the trialkyl aluminum is an alkyl aluminum compound represented by general formula (1) below:

$$AlR^1{}_3 \qquad (1)$$

in the formula, $R^1$ represents an n-octyl group.

3. A composition for forming a particulate or film-shaped aluminum oxide, which is comprised of a solution containing an alkyl aluminum partial hydrolyzate and a non-polar organic solvent, wherein the alkyl groups in the alkyl aluminum partial hydrolyzate may be the same or different and have 7 to 12 carbon atoms, the molar ratio of alkyl groups relative to aluminum atoms falls within the range of 0.2 to 2, and the molar ratio of oxygen atoms relative to aluminum atoms falls within the range of 1.4 to 0.5.

4. The composition according to claim 3, wherein the alkyl groups are n octyl groups.

5. A method for producing an aluminum oxide film, the method comprising: coating a substrate with the composition according to claim 3, and then removing the non-polar organic solvent to form an aluminum oxide film.

6. A method for producing a particulate aluminum oxide-containing substrate, the method comprising: mixing the composition according to claim 3 with a substrate-forming binder, and then removing the non-polar organic solvent to form a particulate aluminum oxide in the binder.

* * * * *